United States Patent
Nakamura et al.

(10) Patent No.: US 9,798,264 B2
(45) Date of Patent: Oct. 24, 2017

(54) METHOD FOR PRODUCING CARRIER FOR DEVELOPING ELECTROSTATIC LATENT IMAGE AND METHOD FOR PRODUCING TWO-COMPONENT DEVELOPER

(71) Applicant: Konica Minolta, Inc., Tokyo (JP)

(72) Inventors: Kosuke Nakamura, Hachioji (JP); Satoshi Uchino, Hino (JP); Koji Shibata, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/283,787

(22) Filed: Oct. 3, 2016

(65) Prior Publication Data

US 2017/0139338 A1    May 18, 2017

(30) Foreign Application Priority Data

Nov. 13, 2015   (JP) ................. 2015-222560

(51) Int. Cl.
*G03G 9/113* (2006.01)
*C09D 133/12* (2006.01)
*C09D 133/10* (2006.01)

(52) U.S. Cl.
CPC ......... *G03G 9/1131* (2013.01); *C09D 133/10* (2013.01); *C09D 133/12* (2013.01); *G03G 9/1133* (2013.01)

(58) Field of Classification Search
CPC .................................................. G03G 9/1133
See application file for complete search history.

(56) References Cited

U.S. PATENT DOCUMENTS

| 2012/0214097 A1* | 8/2012 | Naka ...................... G03G 9/107 430/111.32 |
| 2012/0225379 A1* | 9/2012 | Mine ...................... G03G 9/1133 430/109.3 |
| 2016/0238960 A1* | 8/2016 | Fukushima .......... G03G 9/1133 |

FOREIGN PATENT DOCUMENTS

JP    2012194230 A    10/2012

* cited by examiner

Primary Examiner — Hoa V Le
(74) Attorney, Agent, or Firm — Lucas & Mercanti, LLP

(57) ABSTRACT

Provided is a method for producing a carrier for developing an electrostatic latent image, the carrier including carrier particles each including a core particle with a surface coated with a coating material including a resin, and the method including the steps of: a) obtaining first coating resin particles by polymerizing an alicyclic methacrylate monomer using, as a polymerization initiator, an azo compound having a nitrogen atom-containing substituent; b) obtaining second coating resin particles by polymerizing an alicyclic methacrylate monomer using a persulfate as a polymerization initiator; and c) forming carrier particles by coating surfaces of core particles with a coating material obtained by mixing at least the first and second coating resin particles.

10 Claims, 2 Drawing Sheets

METHOD FOR PRODUCING CARRIER FOR DEVELOPING ELECTROSTATIC LATENT IMAGE AND METHOD FOR PRODUCING TWO-COMPONENT DEVELOPER

The entire disclosure of Japanese Patent Application No. 2015-222560 filed on Nov. 13, 2015 including description, claims, drawings, and abstract are incorporated herein by reference in its entirety.

BACKGROUND OF THE INVENTION

Field of the Invention

The present invention relates to a method for producing a carrier for developing an electrostatic latent image and a method for producing a two-component developer. More specifically, the present invention relates to a method for producing a carrier that is for developing an electrostatic latent image and has an improved level of charge amount, durability, and other properties.

Description of the Related Art

In recent years, toner particles have been required to have improved melt fixability onto recording media during fixation, to have improved fixability at low temperature for the purpose of achieving energy savings, and to have reduced sizes for the purpose of achieving high image quality. Low-temperature fixing toner includes a binder resin with a low glass transition temperature or a crystalline resin, which enables low-temperature fixation.

Unfortunately, there is a problem in that an external additive can be easily fixed and buried in a resin with a low glass transition temperature, which can decrease chargeability, and a crystalline resin resists holding generated charges due to its low-resistance properties, which can reduce charge amount. On the other hand, small size toner particles have the problem of reduced chargeability per particle because they have reduced fluidity and reduced frictionally-chargeable surface area per particle due to their small size.

Thus, for example, there is disclosed the use of a resin with high chargeability as a carrier coating resin to suppress the reduction in charge amount (see, for example, JP 2012-194230 A).

However, the use of a resin with high chargeability can cause large differences in charging in a low-temperature, low-humidity environment or cause large environmentally-induced differences in charge amount, and there is still a need for further improvement in this regard.

SUMMARY OF THE INVENTION

The present invention has been accomplished in view of the above problems and circumstances, and an object of the present invention is to provide methods for producing an electrostatic latent image developing carrier and a two-component developer that can each have a larger charge amount and resist environmental temperature and humidity change-induced fluctuations in charge amount, and thus can each prevent image density reduction, fogging, and toner scattering, and can also each have high durability.

As a result of studies to solve the above problems, the inventor has found that an electrostatic latent image developing carrier with an improved level of charge amount, durability, and other properties can be produced through polymerization of an alicyclic methacrylate monomer.

Specifically, the object of the present invention can be achieved by the following measures.

1. To achieve the abovementioned object, according to an aspect, there is provided a method for producing a carrier for developing an electrostatic latent image, the carrier comprising carrier particles each comprising a core particle with a surface coated with a coating material comprising a resin, and the method reflecting one aspect of the present invention comprises the steps of:
    a) obtaining first coating resin particles by polymerizing an alicyclic methacrylate monomer using, as a polymerization initiator, an azo compound having a nitrogen atom-containing substituent;
    b) obtaining second coating resin particles by polymerizing an alicyclic methacrylate monomer using a persulfate as a polymerization initiator; and
    c) forming carrier particles by coating surfaces of core particles with a coating material obtained by mixing at least the first and second coating resin particles.

2. The method for producing a carrier for developing an electrostatic latent image of Item. 1, wherein the ratio between the first and second coating resin particles is preferably in the range of 10:90 to 90:10.

3. The method for producing a carrier for developing an electrostatic latent image of Item. 1 or 2, wherein the alicyclic methacrylate monomers preferably make up 20 to 100% by weight of the total weight of monomers used to form the first and second coating resin particles.

4. The method for producing a carrier for developing an electrostatic latent image of any one of Items. 1 to 3, wherein the alicyclic methacrylate monomers used to form the first and second coating resin particles preferably have a cycloalkyl group of 5 to 8 carbon atoms.

5. The method for producing a carrier for developing an electrostatic latent image of any one of Items. 1 to 4, wherein the alicyclic methacrylate monomer used to form the first coating resin particles preferably has a cycloalkyl group, the alicyclic methacrylate monomer used to form the second coating resin particles has a cycloalkyl group, and these cycloalkyl groups preferably have the same number of carbon atoms.

6. The method for producing a carrier for developing an electrostatic latent image of any one of Items. 1 to 5, wherein the core particles preferably have an average shape factor in the range of 110 to 140.

7. The method for producing a carrier for developing an electrostatic latent image of any one of Items. 1 to 6, wherein the core particles preferably have a median diameter in the range of 25 to 70 μm.

8. The method for producing a carrier for developing an electrostatic latent image of anyone of Items. 1 to 7, wherein the coating material is preferably produced by a dry coating method.

9. To achieve the abovementioned object, according to an aspect, there is provided a method for producing a two-component developer comprising toner particles comprising toner base particles and an external additive adhering to the toner base particles, and carrier particles each comprising a core particle with a surface coated with a coating material comprising a resin, and the method reflecting one aspect of the present invention comprises the steps of:
    a) obtaining first coating resin particles by polymerizing an alicyclic methacrylate monomer using, as a polymerization initiator, an azo compound having a nitrogen atom-containing substituent;
    b) obtaining second coating resin particles by polymerizing an alicyclic methacrylate monomer using a persulfate as a polymerization initiator;

c) forming carrier particles by coating surfaces of core particles with a coating material obtained by mixing at least the first and second coating resin particles;

d) forming toner particles by allowing an external additive to adhere to toner base particles; and e) obtaining a two-component developer by mixing the coated carrier particles with the toner particles.

10. The method for producing a two-component developer of Item. 9, wherein the toner preferably comprises a crystalline resin and an amorphous resin.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
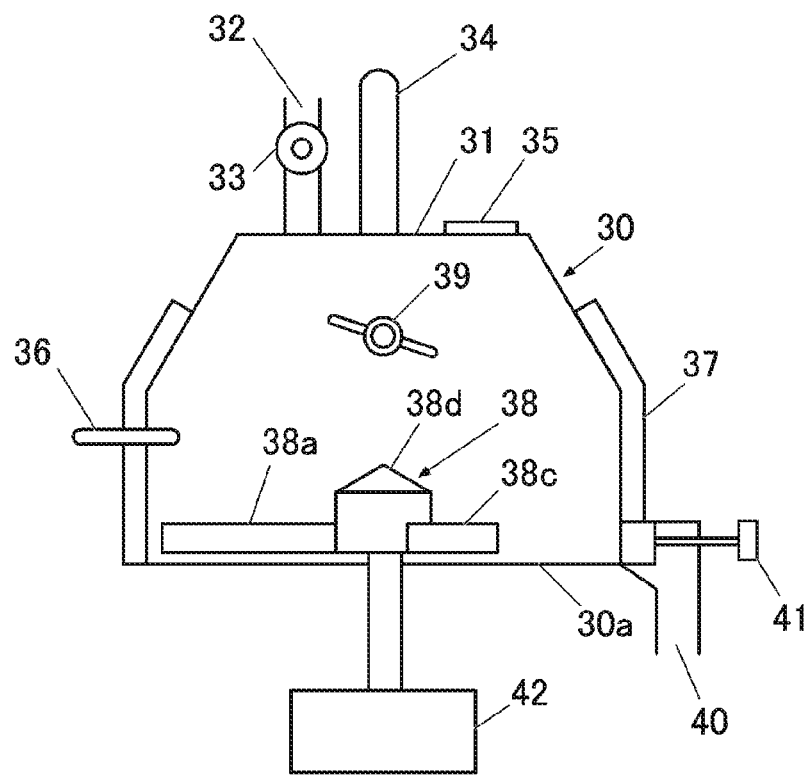
FIG. 1 is a schematic diagram showing an example of a stirring apparatus for use in the method for producing a carrier for developing an electrostatic latent image according to the present invention.

Hereinafter, an embodiment of the present invention will be described with reference to the drawings. However, the scope of the invention is not limited to the illustrated examples.

The present invention is directed to a method for producing a carrier that is for developing an electrostatic latent image and includes carrier particles each including a core particle with its surface coated with a coating material including a resin, the method including the steps of: a) obtaining first coating resin particles by polymerizing an alicyclic methacrylate monomer using, as a polymerization initiator, an azo compound having a nitrogen atom-containing substituent; b) obtaining second coating resin particles by polymerizing an alicyclic methacrylate monomer using a persulfate as a polymerization initiator; and c) forming carrier particles by coating the surfaces of core particles with a coating material obtained by mixing at least the first and second coating resin particles.

The present invention is also directed to a method for producing a two-component developer including: toner particles including toner base particles and an external additive adhering to the toner base particles; and carrier particles each including a core particle with its surface coated with a coating material including a resin, the method including the steps of: a) obtaining first coating resin particles by polymerizing an alicyclic methacrylate monomer using, as a polymerization initiator, an azo compound having a nitrogen atom-containing substituent; b) obtaining second coating resin particles by polymerizing an alicyclic methacrylate monomer using a persulfate as a polymerization initiator; c) forming carrier particles by coating the surfaces of core particles with a coating material obtained by mixing at least the first and second coating resin particles; d) forming toner particles by allowing an external additive to adhere to toner base particles; and e) obtaining a two-component developer by mixing the coated carrier particles with the toner particles.

These features are technical features common or corresponding to the aspects of the invention recited in the respective claims.

The ratio between the first and second coating resin particles is preferably in the range of 10:90 to 90:10, so that the resin particles can be uniformly mixed together.

The content of the alicyclic methacrylate monomers in the monomers used to form the first and second coating resin particles is preferably in the range of 20 to 100% by weight based on the total weight of all the monomers, so that a carrier with a desired charge amount can be formed.

The alicyclic methacrylate monomers used to form the first and second coating resin particles preferably have a cycloalkyl group of 5 to 8 carbon atoms in view of mechanical strength, environmental stability of charge amount, and ease of polymerization.

The alicyclic methacrylate monomer used to form the first coating resin particles preferably has a cycloalkyl group, the alicyclic methacrylate monomer used to form the second coating resin particles also preferably has a cycloalkyl group, and these cycloalkyl groups preferably have the same number of carbon atoms. In this case, the compatibility or adhesion between the particles of both resins are better than that in the case where the cycloalkyl groups have different numbers of carbon atoms, and both resins can have high strength and the advantage of highly keeping both high chargeability and small environmentally-induced differences, so that both resins can sustain high durability.

The core particles preferably have an average shape factor in the range of 110 to 140, so that the coating material can have a certain thickness distribution.

The core particles also preferably have a median diameter in the range of 25 to 70 μm, so that they can reliably have a sufficient contact area with toner particles and stably form high-quality toner images.

In addition, the coating material is preferably produced using a dry coating method, so that a uniform coating layer can be easily formed.

In the method for producing a two-component developer according to the present invention, the toner particles preferably contain a crystalline resin and an amorphous resin in order to allow the toner to have both good chargeability and good fixability.

Hereinafter, the present invention, the elements of the present invention, and embodiments and modes for carrying out the present invention will be described in detail. As used hereinafter, the word "to" shall mean to include the values before and after it as the lower and upper limits.

In the present invention, the toner contains at least toner base particles. As used herein, the term "toner" refers to a collection of "toner particles." The term "toner particles" refers to toner base particles themselves or a mixture of the toner base particles with at least an external additive. If necessary, the toner particles may also contain internal additives such as a colorant and a charge control agent.

<<Method for Producing Carrier for Developing Electrostatic Latent Image>>

The present invention is directed to a method for producing a carrier that is for developing an electrostatic latent image and includes carrier particles each including a core particle with its surface coated with a coating material including a resin. The method for producing a carrier according to the present invention includes at least the steps a, b, and c described below and thus is effective in increasing charge amount, suppressing environmental temperature and humidity change-induced fluctuations in charge amount, and providing high durability. Step a: The step of obtaining first coating resin particles by polymerizing at least an alicyclic methacrylate monomer using, as a polymerization initiator, an azo compound having a nitrogen atom-containing substituent. Step b: The step of obtaining second coating resin particles by polymerizing at least an alicyclic methacrylate monomer using a persulfate as a polymerization initiator. Step c: The step of forming carrier particles by coating the surfaces of core particles with a coating material obtained by mixing at least the first and second coating resin particles.

(Step a: The Step of Forming First Coating Resin Particles)

In the step a, first coating resin particles (hereinafter also simply referred to as the "first coating resin") are formed by polymerizing an alicyclic methacrylate monomer using, as a polymerization initiator, an azo compound having a nitrogen atom-containing substituent. The first coating resin contains a nitrogen atom as an element constituting the resin.

The first coating resin is prepared by polymerizing a polymerizable monomer or monomers including at least an alicyclic methacrylate monomer using, as a polymerization initiator, an azo compound having a nitrogen atom-containing substituent. The first coating resin prepared in such a way contains a nitrogen atom having an electron pair as a charge site and being located at a molecular chain end, so that it can ensure more effective chargeability and increase charge amount.

The resin containing a nitrogen atom located at a molecular chain end has no polar group in the molecular chain, and thus has high moisture resistance and allows environmental temperature and humidity change-induced fluctuations in charge amount to be kept at a low level, as compared with a resin obtained through adding a nitrogen atom-containing acrylate monomer as a copolymerizable component or a resin obtained through adding nitrogen atom-containing resin particles.

In the coating resin, the molecular chain end having the introduced nitrogen atom has high mobility and can be easily exposed on the resin surface, which can make even a small amount of the resin effective.

The first coating resin particles may be formed by any method capable of producing a coating resin having an introduced nitrogen atom in the molecular chain end. The first coating resin particles may be formed using a known polymerization method.

In view of cost, environment, and other factors, a suspension polymerization method or an emulsion polymerization method is preferably used.

It is also conceivable that when a resin having a nitrogen atom bonded to the molecular chain end is used as a coating resin, many charge sites can be provided, so that a reduction in charge amount can be suppressed even when toner particles and an external additive adhere to the carrier surface.

An azo compound having a nitrogen atom-containing substituent (a compound having an azo group and a structure containing a nitrogen atom in the substituent) is used as a polymerization initiator for the production of the first coating resin. Examples of such an azo compound include 2,2'-azobisisobutyronitrile, 2,2'-azobis(2,4-dimethylvaleronitrile), 2,2'-azobis(4-methoxy-2,4-dimethylvaleronitrile), dimethyl 2,2'-azobisisobutyrate, 4,4'-azobis(4-cyanopentanoic acid), 2,2'-azobis(2-amidinopropane) dihydrochloride, 2,2'-azobis(N,N'-dimethyleneisobutylamidine), and 2,2'-azobis(N,N'-dimethyleneisobutylamidine) dihydrochloride.

The azo compound polymerization initiator is preferably used in an amount of 0.1 to 3% by weight based on the total weight of the monomers.

The monomer or monomers used to form the first coating resin include at least an alicyclic methacrylate. When an alicyclic methacrylate monomer, which is highly hydrophobic, is used to form the first coating resin, the resulting carrier particles can show reduced water adsorption and reduced environmentally-induced differences in chargeability and can help to suppress the reduction in charge amount particularly in a high-temperature, high-humidity environment.

In addition, the resin obtained by polymerizing monomers including an alicyclic methacrylate has a suitable level of chargeability and mechanical strength and can form a coating material capable of undergoing a suitable degree of coating wear, which makes it possible to refresh the carrier particle surface, to which toner particles and an external additive adhere, and thus to suppress the reduction in charge amount.

Besides the alicyclic methacrylate monomer, the monomers for the production of the first coating resin may include, for example, a chain (meth)acrylate monomer, styrene, vinyl acetate, vinyl chloride, or other monomers. In order to address wear of the coating resin, a chain (meth) acrylate monomer is preferably used.

The alicyclic methacrylate monomer is a methacrylic ester compound having a cycloalkyl group as a moiety derived from an alcohol. In view of mechanical strength, environmental stability of charge amount, and ease of polymerization, the alicyclic methacrylate monomer is preferably one having a cycloalkyl group of 5 to 8 carbon atoms, such as cyclopentyl methacrylate, cyclohexyl methacrylate, cycloheptyl methacrylate, or cyclooctyl methacrylate. Among them, cyclohexyl methacrylate is particularly preferred in view of mechanical strength, environmental stability of charge amount, and easy availability.

The chain (meth)acrylate monomer is a (meth)acrylic ester compound having a chain alkyl group as a moiety derived from an alcohol. Specifically, the chain (meth) acrylate monomer may be, for example, methyl methacrylate, ethyl methacrylate, propyl methacrylate, n-butyl methacrylate, hexyl methacrylate, octyl methacrylate, 2-ethylhexyl methacrylate, methyl acrylate, ethyl acrylate, propyl acrylate, n-butyl acrylate, hexyl acrylate, octyl acrylate, or 2-ethylhexyl acrylate.

The monomers for the production of the first coating resin preferably include an alicyclic methacrylate monomer and a chain (meth)acrylate monomer, so that both suitable wear resistance and suitable electrical resistance can be attained. In particular, the monomers for the production of the coating resin preferably include an alicyclic methacrylate monomer and methyl methacrylate.

(Step b: The Step of Forming Second Coating Resin Particles)

In the step b, second coating resin particles (hereinafter also simply referred to as the "second coating resin") are formed by polymerizing an alicyclic methacrylate monomer using a persulfate as a polymerization initiator. The second coating resin contains a sulfur atom as an element constituting the resin.

The second coating resin is prepared by polymerizing a polymerizable monomer or monomers including at least an alicyclic methacrylate monomer using a persulfate as a polymerization initiator. The second coating resin prepared in such a way contains a sulfur atom in the form of a sulfonic acid or sulfonate group located at a molecular chain end. The sulfonic acid or sulfonate group can moderately accelerate the transfer of electrons and suppress excessive charging in a low-temperature, low-humidity environment, which makes it possible to suppress environmental temperature and humidity change-induced fluctuations in charge amount.

The resin having a sulfonic acid or sulfonate group located at the molecular chain end has high moisture resistance and thus allows environmental temperature and humidity change-induced fluctuations in charge amount to be kept at a low level, as compared with a resin obtained through adding a sulfonic acid or sulfonate group-containing acrylate monomer as a copolymerizable component or a resin obtained through adding sulfonic acid or sulfonate group-containing resin particles.

In the coating resin, the molecular chain end having the introduced sulfur atom has high mobility and can be easily exposed on the resin surface, which can make even a small amount of the resin effective. On the other hand, since the inner part of the resin has a low content of sulfur atom forming a polar group, the resin maintains hydrophobicity and has low water adsorption.

The second coating resin particles may be formed by any method capable of producing a coating resin having an introduced sulfur atom in the molecular chain end. The second coating resin particles may be formed using a known polymerization method.

In view of cost, environment, and other factors, a suspension polymerization method or an emulsion polymerization method is preferably used.

A persulfate is used as a polymerization initiator for the production of the second coating resin. The persulfate may be, for example, ammonium persulfate, sodium persulfate, or potassium persulfate.

The persulfate is preferably used in an amount of 0.1 to 3% by weight based on the total weight of the monomers.

The monomer or monomers used to form the second coating resin include at least an alicyclic methacrylate. When an alicyclic methacrylate monomer, which is highly hydrophobic, is used to form the second coating resin, the resulting carrier particles can show reduced water adsorption and reduced environmentally-induced differences in chargeability and can help to suppress the reduction in charge amount particularly in a high-temperature, high-humidity environment.

In addition, the resin obtained by polymerizing monomers including an alicyclic methacrylate has a suitable level of chargeability and mechanical strength and can form a coating material capable of undergoing a suitable degree of coating wear, which makes it possible to refresh the carrier particle surface, to which toner particles and an external additive adhere, and thus to suppress the reduction in charge amount.

Besides the alicyclic methacrylate monomer, the monomers for the production of the second coating resin may include, for example, a chain (meth)acrylate monomer, styrene, vinyl acetate, vinyl chloride, or other monomers. In order to address wear of the coating resin, a chain (meth)acrylate monomer is preferably used.

Examples of the alicyclic methacrylate monomer and the chain (meth)acrylate monomer may include the same compounds as in the step a.

The monomers for the production of the second coating resin preferably include an alicyclic methacrylate monomer and a chain (meth)acrylate monomer, so that both suitable wear resistance and suitable electrical resistance can be attained. In particular, the monomers for the production of the coating resin preferably include an alicyclic methacrylate monomer and methyl methacrylate.

In the present invention, an alicyclic methacrylate monomer is used to form both the first and second coating resin particles, so that the resulting resins can be well and uniformly mixed together, which can improve the adhesion between the particles of the resins and increase the coating strength.

The ratio between the first coating resin particles and the second coating resin particles is preferably in the range of 10:90 to 90:10, more preferably in the range of 20:80 to 80:20.

If the ratio of the first or second coating resin particles to the total of the coating resin particles is less than 10, the effects of the individual types of coating resin particles (high chargeability and small environmentally-induced differences) may be difficult to attain. On the other hand, when the ratio of the first or second coating resin particles to the total of the coating resin particles is 10 or more, the resin particles can be uniformly mixed, so that the individual resin particles can be uniformly deposited on the surfaces of core particles, which makes it possible to obtain the advantageous effects of both resins and thus is preferred.

The carrier with a desired charge amount can be formed by controlling the ratio between the first and second coating resin particles.

The content of the alicyclic methacrylate monomers in the monomers for the production of the first and second resin particles is preferably in the range of 20 to 100% by weight, more preferably in the range of 30 to 100% by weight, even more preferably in the range of 30 to 70% by weight, based on the total weight of all the monomers.

When the content of the alicyclic methacrylate monomers falls within the above range, the coating resins can be ensured to have hydrophobicity and can help to reduce environmental temperature and humidity change-induced fluctuations in charge amount.

As compared with the chain (meth)acrylate monomer, the alicyclic methacrylate monomer has a rigid skeleton and can make the coating strength high.

The alicyclic coating resins preferably have a weight average molecular weight in the range of 300,000 to 1,000,000. The coating resins with a weight average molecular weight in the above range can have an appropriately high level of strength and undergo a suitable degree of coating wear, which can enhance the effect of refreshing the carrier particle surface.

The weight average molecular weight of the coating resins should be measured using gel permeation chromatography (GPC).

Specifically, the measurement sample is dissolved at a concentration of 1 mg/mL in tetrahydrofuran. The dissolution is performed using an ultrasonic disperser under the conditions of room temperature for 5 minutes. Subsequently, after the sample solution is treated with a membrane filter with a pore size of 0.2 μm, 10 μL of the sample solution is subjected to GPC.

<GPC Measurement Conditions>
System: HLC-8220 (manufactured by Tosoh Corporation)
Columns: (TSKguardcolumn+TSKgel SuperHZM-M)×3 (manufactured by Tosoh Corporation)
Column temperature: 40° C.
Solvent: Tetrahydrofuran
Flow rate: 0.2 mL/min
Detector: Refractive index detector (RI detector)

When the molecular weight of the sample is measured, the molecular weight distribution of the sample is calculated using a calibration curve determined with monodisperse polystyrene standard particles. Ten polystyrene standards are used for the determination of the calibration curve.

The alicyclic methacrylate monomers used to form the first and second coating resin particles each preferably have a cycloalkyl group, and the cycloalkyl groups of the alicyclic methacrylate monomers preferably have the same number of carbon atoms. When the cycloalkyl groups of the alicyclic methacrylate monomers have the same number of carbon atoms, the compatibility or adhesion between the particles of the resins are better than that in the case where the cycloalkyl groups have different numbers of carbon atoms, and both resins can have high strength and the advantage of highly keeping both high chargeability and small environmentally-induced differences, so that both resins can sustain high durability.

(Step c: The Step of Forming Carrier Particles)

In the step c, carrier particles are formed by coating the surfaces of core particles with a coating material obtained by mixing at least the first and second coating resin particles.

The present invention has the feature that carrier particles are formed by coating the surfaces of core particles with a coating material obtained by mixing the nitrogen atom-containing first coating resin particles with the second coating resin particles containing a sulfur atom in the form of a sulfonic acid or sulfonate group, so that the resulting carrier can have increased advantages of nitrogen atom-induced high chargeability and sulfonic acid or sulfonate group-induced environmental properties (small environmentally-induced differences) rather than the average performance of these properties.

Although the detailed mechanism is not clear, it is conceivable that when an alicyclic methacrylate monomer is used to form both the first and second coating resin particles, the resulting resins can be well and uniformly mixed together, which makes it possible to simultaneously achieve nitrogen atom-induced high chargeability and sulfonic acid or sulfonate group-induced environmental properties, so that improvement in charge amount and reduction in environmental temperature and humidity change-induced fluctuations in charge amount can be achieved at a certain level that is not achievable by using one of the resins.

In general, if different types of resin particles are mixed together, a problem can occur in which the adhesion at the interface is low so that cracking or coating delamination can occur to accelerate the wear of carrier coatings. In the present invention, however, an alicyclic methacrylate monomer is used to form both the first and second coating resin particles, so that the particles of the resulting resins can have improved adhesion to each other and can form a coating with high strength and high durability.

<Preparation of Coating Material>

The carrier particles constituting the carrier each include a core particle and a coating material with which the surface of the core particle is coated. The method for coating the core particle surface with the coating material may be, for example, a wet coating method, a dry coating method, or a combination of wet and dry coating methods. Although any of these methods may be used for the preparation, a dry coating method is preferred because it can easily form a uniform coating layer. Hereinafter, each method will be described.

(Wet Coating Method)

(1) Fluidized Bed Spray Coating Method

A fluidized bed spray coating method may include preparing a coating liquid by dissolving a coating resin in a solvent, performing spray coating of the coating liquid onto the surface of core particles using a fluid spray coating apparatus, and then drying the coating to form a coating layer.

(2) Immersion Coating Method

An immersion coating method may include preparing a coating liquid by dissolving a coating resin in a solvent, performing coating treatment by immersing core particles in the coating liquid, and then performing drying to form a coating film.

(3) Polymerization Method

A polymerization method may include preparing a coating liquid by dissolving a reactive compound in a solvent, performing coating treatment by immersing core particles in the coating liquid, and then performing polymerization reaction by applying heat or other energy to form a coating film.

(Dry Coating Method)

A dry coating method may include allowing resin particles to adhere to the surfaces of core particles to be coated and then applying a mechanical impact force to melt or soften the resin particles adhering to the surfaces of the core particles, so that the resin particles are bonded to the core particles to form a coating material. An apparatus for applying a mechanical impact force with or without heating may be used to repeatedly apply the impact force to a mixture of core particles, resin particles, and low-resistance fine particles or other particles so that carrier particles each including the core particle with the surface coated with a coating material can be formed.

The apparatus for applying a mechanical impact may be, for example, a horizontal stirring blade-equipped, high-speed mixer or a mill having a rotor and a liner, such as Turbo Mill (manufactured by Turbo Kogyo Co., Ltd.) or Pin Mill or KRYPTRON (manufactured by Kawasaki Heavy Industries, Ltd.). A horizontal stirring blade-equipped, high-speed mixer is preferably used.

When heating is performed, the heating temperature is preferably in the range of 60 to 130° C. When the heating is performing at a temperature in this range, aggregation of resin-coated carrier particles can be suppressed.

When the carrier is prepared by a wet method, the effect of surface tension makes it easy to uniformly coat the core particles with the resin, which tends to narrow the thickness distribution of the coating material described below. Particularly in this case, the thin part is reduced, so that the carrier tends to have too high an electrical resistivity and to have too large a charge amount at low temperature and low humidity. On the other hand, when the carrier is prepared by a dry method, the resin is deposited thickly on dents of the core but thinly on bumps of the core, which allows the carrier to have an appropriately reduced level of electrical resistivity and to have reduced environmentally-induced differences in charge amount. In addition to the effect of the thickness distribution of the coating material, the dents are filled with the resin, so that the carrier particles can have a near-spherical shape, which also produces a fluidity-increasing effect.

A method using the stirring apparatus shown in FIG. 1 will be specifically described as a method according to the present invention for producing a carrier.

As shown in FIG. 1, the stirring apparatus includes a mixing and stirring vessel 30 having an upper lid 31 provided with a feed valve 33-equipped, raw material feed inlet 32, a filter 34, and an inspection opening 35. A horizontally rotatable rotor 38 driven by a motor 42 is provided at the bottom of the interior of the mixing and stirring vessel 30.

Figure 2:
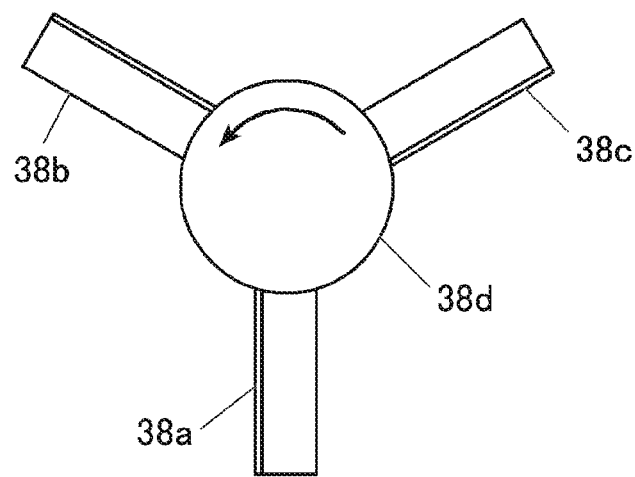
FIG. 2 is a plan view of a horizontally rotatable rotor in the stirring apparatus of FIG. 1.
Figure 3:
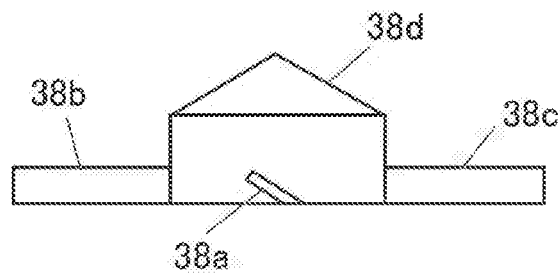
FIG. 3 is a front view of the horizontally rotatable rotor in the stirring apparatus of FIG. 1.

As shown in FIG. 2, the horizontally rotatable rotor 38 includes a central part 38d rotatable in the arrow direction and three rotor blades 38a, 38b, and 38c extending at regular intervals from the central part 38d and each including an elongated body. As shown in FIG. 3, the rotor blades 38a, 38b, and 38c are each arranged in such a manner that one side of the elongated body is placed close to the bottom 30a of the mixing and stirring vessel 30 while another side of the elongated body is located at an obliquely upper position, for example, with an angle of elevation of 120° from the bottom 30a of the mixing and stirring vessel 30, so that a tilted surface facing the upper lid 31 is formed.

As shown in FIG. 1, a jacket 37 and a material temperature measuring thermometer 36 are also provided, in which the jacket 37 functions as heating means during the stirring of raw materials for the carrier and also functions as cooling means after the stirring of raw materials for the carrier is completed.

If necessary, a vertically rotatable rotor 39 having two rotor blades should also be preferably provided so that it can rotate in the arrow direction to facilitate the stirring of the raw materials for the carrier and to prevent the aggregation of the raw materials.

In addition, a product discharge port 40 equipped with a discharge valve 41 is provided.

In the stirring apparatus with such features, if necessary, a pre-mixing step may be performed, which includes feeding raw materials for the carrier, such as core particles and coating resin particles, from the raw material feed inlet 32, allowing cooling water in the range of 10° C. to 15° C. to flow through the jacket 37, rotating the stirring blades 38a, 38b, and 38c at a peripheral speed of 1 m/sec or less, and mixing and stirring the fed raw materials for the carrier for 1 to 2 minutes while the temperature in the mixing and stirring vessel 30 is kept lower than the glass transition temperature (Tg) of the coating resins.

Subsequently, the step of forming a carrier intermediate may be performed, which includes allowing cooling water in the range of 10° C. to 15° C. to flow through the jacket 37, rotating the stirring blades 38a, 38b, and 38c at a peripheral speed of 10 m/sec or less, and mixing and stirring the pre-mixed raw materials for the carrier for 10 to 60 minutes while the temperature in the mixing and stirring vessel 30 is kept lower than the Tg of the coating resins, so that a carrier intermediate is formed by allowing the coating resin particles to adhere to the surfaces of core particles.

Subsequently, the step of forming carrier particles may be performed, which includes allowing warm water or steam to flow through the jacket 37 and stirring the carrier intermediate for 5 to 60 minutes by rotating the stirring blades 38a, 38b, and 38c at a peripheral speed equal to or higher than that in the carrier intermediate forming step to apply a mechanical impact force, while the temperature in the mixing and stirring vessel 30 is set equal to or higher than the Tg of the coating resins, so that carrier particles each including the core particle and a resin coating on its surface are formed.

Subsequently, while cold water in the range of 10 to 15° C. is allowed to flow through the jacket 37, the stirring blades 38a, 38b, and 38c are rotated at a peripheral speed equal to or lower than that in the carrier particle forming step. When the temperature is decreased to be equal to or lower than the Tg of the coating resins, the discharge valve 41 is opened, and the carrier particles formed are taken out from the product discharge port 40.

(Properties of Coating Material)

The coating material on the carrier particles preferably has an average thickness in the range of 0.05 to 4.0 µm, more preferably in the range of 0.2 to 3.0 µm in order for the carrier to have both high durability and low electrical resistance.

When the average thickness of the coating material falls within the above range, the levels of chargeability and durability can be set in a preferred range.

The average thickness of the coating material is the value calculated by the method described below.

Using a focused ion beam system SMI2050 (manufactured by Hitachi High-Tech Science Corporation), a measurement sample is prepared by cutting a carrier particle along a plane passing through its center. The cross-section of the measurement sample is observed in a field of view at a magnification of 5,000 times using a transmission electron microscope JEM-2010F (manufactured by JEOL Ltd.), and the maximum thickness and the minimum thickness of the coating of the sample are measured in the field of view. The thickness of the coating material is defined as the average of values obtained by measuring 50 measurement samples.

In the present invention, the carrier preferably has an electrical resistivity in the range of $10^7$ to $10^{12}$ Ω·cm, more preferably in the range of $10^8$ to $10^{11}$ Ω·cm.

The carrier with an electrical resistance in the above range can be most suitable for the formation of high-concentration toner images.

In the present invention, the term "volume resistivity" refers to the resistance measured dynamically under development conditions using a magnetic brush. Specifically, a photoreceptor drum is replaced with an aluminum electrode drum with the same size as that of the photoreceptor drum, and the carrier particles are supplied onto a development sleeve to form a magnetic brush. While the magnetic brush is brought into contact with the aluminum electrode drum, the current flowing between the development sleeve and the drum is measured with a voltage (500 V) applied between the development sleeve and the drum. The volume resistivity of the carrier particles can be calculated from the measurement using formula (1) below.

$$DVR(\Omega cm) = (V/I) \times (N \times L/Dsd) \qquad \text{Formula (1)}$$

DVR: Volume resistivity (Ω·cm)
V: Voltage between development sleeve and drum (V)
I: Measured current value (A)
N: Development nip width (cm)
L: Development sleeve length (cm)
Dsd: Distance (cm) between development sleeve and drum In the present invention, the measurement is performed under the conditions: V=500 V, N=1 cm, L=6 cm, and Dsd=0.6 mm.

The volume resistivity of the carrier particles can be controlled by controlling, for example, the added amount of the coating resins (the thickness of the coating material), the shape of the carrier particles, or the amount of a conductive agent added to the coating material.

In the present invention, the carrier preferably has a saturation magnetization in the range of 30 to 80 Am²/kg and a residual magnetization of 5.0 Am²/kg or less.

When the carrier with such magnetic properties is used, partial aggregation of the carrier particles can be prevented, so that the two-component developer can be uniformly dispersed on the surface of a developer carrying member, which makes it possible to form a uniform, high-definition, toner image with no unevenness in density.

The residual magnetization can be reduced using ferrite. The carrier with a low residual magnetization can have high fluidity and thus forma two-component developer of uniform bulk density.

Besides the coating reins, if necessary, charge control particles, conductive particles, or other particles may be added to form the coating material.

The charge control particles may be made of, for example, strontium titanate, calcium titanate, magnesium oxide, an azine compound, a quaternary ammonium salt, or triphenylmethane. The amount of the charge control particles added to the coating resins is preferably in the range of 2 to 40 parts by weight in the case of strontium titanate, calcium titanate, or magnesium oxide, and preferably in the range of 0.3 to 10 parts by weight in the case of an azine compound, a quaternary ammonium salt, or triphenylmethane.

The conductive particles may be made of, for example, carbon black, zinc oxide, or tin oxide. The amount of low-resistance fine particles added to the coating resins is preferably in the range of 2 to 40 parts by weight in the case of carbon black, in the range of 2 to 150 parts by weight in the case of zinc oxide, and in the range of 2 to 200 parts by weight in the case of tin oxide.

In the coating material, the resins used to form the coating material may be in the form of a uniform layer or bonded particles without any problems as long as the coating material has good adhesion to the core particles and also have wear resistance.

<Core Particles>

The core particles constituting the carrier particles include, for example, metal particles such as iron particles, or particles of any of various ferrites. Among these materials, ferrites are preferred.

Preferred are ferrites containing copper, zinc, nickel, manganese, or any other heavy metal or light metal ferrites containing an alkali metal or an alkaline earth metal.

Ferrites are compounds represented by $(MO)x(Fe_2O_3)y$, in which the molar ratio y of $Fe_2O_3$ constituting the ferrites is preferably in the range of 30 to 95% by mole. Ferrites with the compositional ratio y in the above range can easily have a desired level of magnetization and thus have advantages such as the capability of forming a carrier that is less likely to cause carrier sticking. In the formula, M is a metal atom such as manganese (Mn), magnesium (Mg), strontium (Sr), calcium (Ca), titanium (Ti), copper (Cu), zinc (Zn), nickel (Ni), aluminum (Al), silicon (Si), zirconium (Zr), bismuth (Bi), cobalt (Co), or lithium (Li). These metals may be used alone or in combination of two or more. Particularly, in order to obtain suitable magnetic properties including low residual magnetization, M is preferably manganese, magnesium, strontium, lithium, copper, or zinc, more preferably manganese or magnesium.

The core particles preferably have an average shape factor (SF-1) in the range of 110 to 140, more preferably in the range of 110 to 130. The core particles with an average shape factor in the range of 110 to 140 allow the coating material to have a thickness distribution. At a thin part of the coating material, the core particle having low resistance properties can make the electrical resistivity of the carrier low, so that electrons can easily move to suppress excessive charging at low temperature and low humidity. A thick part of the coating material can hold charges, which makes it possible to increase the charge amount at high temperature and high humidity and to reduce environmentally-induced differences in charge amount.

The average shape factor SF-1 of the carrier core can be controlled by changing the ratio between the components of the carrier core material, the degree of grinding of raw materials, the firing temperature, and the oxygen concentration.

The average shape factor (SF-1) of the core particle is the value calculated from formula (2) below.

$$SF\text{-}1=\{(MXLNG)^2/(AREA)\}\times(n/4)\times100 \quad \text{Formula (2)}$$

In formula (2), MXLNG represents the maximum diameter of the core particle, and AREA represents the projected area of the core particle.

In this regard, the maximum diameter refers to the greatest possible distance between two parallel lines tangent to the projection of the core particle on the plane. The projected area refers to the area of the projection of the core particle on the plane.

The maximum diameter and projected area of the core particle can be determined by the measurement method described below.

Specifically, 100 or more core particles are randomly selected and imaged with a scanning electron microscope at a magnification of 150 times. The resulting images are input into a scanner and then measured using an image processing analyzer LUZEX AP (manufactured by NIRECO CORPORATION).

The average shape factor of the core particles is defined as the value calculated by averaging shape factors calculated from formula (2).

As regards the particle size, the core particles preferably have a volume median diameter (D50) in the range of 25 to 70 μm, more preferably in the range of 25 to 65 μm. The core particles with a volume median diameter (D50) in the above range can be ensured to have a sufficient contact area with the toner, which makes it possible to stably form high-quality toner images. The volume median diameter (D50) of the core particles can be measured using a laser diffraction particle size distribution analyzer HELOS & RODOS (manufactured by Sympatec GmbH) equipped with a wet disperser.

<<Method for Producing Two-Component Developer>>

The present invention is directed to a method for producing a two-component developer including: toner particles including toner base particles and an external additive adhering to the toner base particles; and carrier particles each including a core particle with its surface coated with a coating material including a resin. The method for producing a two-component developer according to the present invention includes the steps a, b, c, d, and e described below. Step a: The step of obtaining first coating resin particles by polymerizing at least an alicyclic methacrylate monomer using, as a polymerization initiator, an azo compound having a nitrogen atom-containing substituent. Step b: The step of obtaining second coating resin particles by polymerizing at least an alicyclic methacrylate monomer using a persulfate as a polymerization initiator. Step c: The step of forming carrier particles by coating the surfaces of core particles with a coating material obtained by mixing at least the first and second coating resin particles. Step d: The step of forming toner particles by allowing an external additive to adhere to toner base particles. Step e: The step of obtaining a two-component developer by mixing the coated carrier particles with the toner particles.

The steps a, b, and c are the same as those in the method for producing the carrier according to the present invention.

(Step d: The Step of Forming Toner)

In this step, toner particles are formed by allowing the external additive described below to adhere to toner base particles including a binder resin and optionally internal additives such as a releasing agent, a charge control agent, and a colorant. In the present invention, the toner particles used include toner base particles and an external additive that is allowed to adhere to the base particles in order to improve fluidity, chargeability, transfer, or cleanability.

[Method for Producing Toner Base Particles]

The toner base particles, in other words, particles at the stage before the addition of the external additive, can be produced by a known toner production method. Specifically, the production method may be what is called a grinding method in which toner base particles are produced through kneading, grinding, and classification steps, or what is called a polymerization-based toner production method in which particles are formed by polymerizing a polymerizable monomer while controlling the shape and size of the particles.

In particular, the polymerization-based toner production method, which can form particles while controlling their size and shape, would be advantageous to the production of toner particles with small sizes for the formation of high-quality images such as fine-dot images and fine-line images. The polymerization-based toner production method may include, for example, preparing toner base particles through the step of forming resin particles by polymerization reaction such as suspension polymerization or emulsion polymerization.

A particularly preferred polymerization-based toner production method includes preparing resin particles of, for example, about 100 nm and performing an association step in which the resin particles are coagulated and fused to form toner base particles. When the association step is performed, toner particles with a core-shell structure can also be prepared, for example, by a process that includes preparing core particles by coagulating low-glass-transition-temperature resin particles contributable to low-temperature fixation and then attaching and coagulating high-glass-transition-temperature resin particles onto the surfaces of the core particles.

An emulsion association process may be performed, which includes first previously forming binder resin particles of around 100 nm by emulsion polymerization or suspension polymerization and coagulating and fusing the resin particles to form toner base particles.

More specifically, polymerizable monomers for forming the binder resin are added to and dispersed in an aqueous medium and then polymerized with a polymerization initiator to form binder resin particles (in the form of a dispersion). When a colorant is added, the colorant is separately dispersed in an aqueous medium to form a dispersion of colorant particles. In the dispersion, the colorant particles preferably have a volume median diameter (D50) in the range of 80 to 200 nm. The volume median diameter of the colorant particles in the dispersion can be measured using, for example, a microtrack particle size distribution analyzer UPA-150 manufactured by NIKKISO CO., LTD.

Subsequently, toner base particles are prepared by coagulating the resin particles and optionally the colorant particles in an aqueous medium while fusing the particles. Specifically, a coagulant such as an alkali metal salt or a Group 2 element salt is added to an aqueous medium containing a mixture of the resin particle dispersion and the colorant particle dispersion, and then the coagulation of the resin particles is allowed to proceed by heating at a temperature equal to or higher than the glass transition temperature of the resin particles, while the resin particles are fused together. Subsequently, when the toner base particles reach the target size, a salt is added to quench the coagulation. Subsequently, aging is performed by heat-treating the reaction system until the toner base particles reach the desired shape, so that the toner base particles are completed.

In a preferred mode of the coagulation process, after the addition of the coagulant, the dispersion is allowed to stand for a time as short as possible (until the heating is started), the heating is started as quickly as possible, and the binder resin is heated at a temperature equal to or higher than its glass transition temperature.

The standing time is generally 30 minutes or less, preferably 10 minutes or less. The temperature at which the coagulant is added is preferably, but not limited to, a temperature not higher than the glass transition temperature of the binder resin.

After the addition, it is preferable to quickly increase the temperature by heating, and the rate of temperature increase is preferably 0.5° C./minute or more.

The upper limit of the rate of temperature increase is preferably, but not limited to, 15° C./minute or less in order to suppress the formation of coarse particles caused by rapid progress of the fusion.

After the dispersion subjected to the coagulation reaches the glass transition temperature or higher, the temperature of the dispersion is held for a certain period of time so that the fusion is continued. In this way, the growth of toner base particles (the coagulation of binder resin particles and colorant particles) and the fusion (elimination of the interface between particles) are allowed to proceed effectively.

More specifically, a base, such as a sodium hydroxide aqueous solution, for imparting coagulating properties is preferably added in advance to the dispersion of the colorant particles and the binder resin particles so that its pH can be adjusted to fall within the range of 9 to 12.

Subsequently, a coagulant such as a magnesium chloride aqueous solution is added to the dispersion containing the binder resin particles and the colorant particles in the temperature range of 25 to 35° C. over 5 to 15 minutes with stirring.

The suitable amount of the coagulant used is in the range of 5 to 20% by weight of the amount of the total solids in the binder resin particles and the colorant particles.

Subsequently, the mixture is allowed to stand for 1 to 6 minutes and then heated to a temperature in the range of 70 to 95° C. over 30 to 90 minutes, so that the coagulated resin and colorant particles are successfully fused. In this process, the volume median diameter of the fused toner base particles is measured, and when the diameter reaches 3 to 5 µm, a sodium chloride aqueous solution or the like is added to quench the growth of the particles.

In the aging treatment, the fusion of the particles may also be continued by heating and stirring at a liquid temperature in the range of 80 to 100° C. until the particles reach an average circularity in the range of 0.900 to 0.980.

<Coagulant>

Any coagulant may be used in the present invention. A coagulant selected from metal salts is preferably used. Examples of metal salts include salts of a monovalent metal such as sodium, potassium, or lithium; salts of a divalent metal such as calcium, magnesium, manganese, or copper; and salts of a trivalent metal such as iron or aluminum.

Specific examples of salts include sodium chloride, potassium chloride, lithium chloride, calcium chloride, magnesium chloride, zinc chloride, copper sulfate, magnesium sulfate, and manganese sulfate. Among them, salts of a divalent metal are particularly preferred. A salt of a divalent metal can be used in a smaller amount for allowing the coagulation to proceed. These salts may be used singly or in combination of two or more.

<Other Additives>

In the coagulation step, the dispersion may further contain the releasing agent, the charge control agent, and other known additives such as a dispersion stabilizer and a surfactant. These additives may be introduced in the form of an additive dispersion into the coagulation step, or the colorant particle dispersion or the binder resin dispersion may contain these additives.

The toner base particles grown to the desired size by the above process are subjected to filtration and drying. The filtration method may be, but not limited to, a centrifugal separation method, a reduced-pressure filtration method using a Nutsche filter or the like, or a filtration method performed using a filter press or the like. The toner base particles (collected cake) separated by filtration are then washed with ion-exchanged water, so that the adhering materials such as the surfactant and the coagulant are removed. The water washing treatment may be performed until the electric conductivity of the filtrate reaches, for example, 3 to 10 µS/cm.

Any drying method capable of drying the washed toner base particles may be used. A known dryer may be used, such as a spray dryer, a vacuum freeze dryer, or a reduced-pressure dryer. Specifically, a stationary shelf dryer, a moving shelf dryer, a fluidized bed dryer, a rotary dryer, a stirring dryer, or an airflow dryer may be used. The dried toner base particles preferably have a water content of 5% by weight or less, more preferably 2% by weight or less.

When the dried toner base particles form aggregates due to weak inter-particle attractive forces, the aggregates may be subjected to a crushing process. In this case, the crushing apparatus may be a mechanical crusher such as a jet mill, a Henschel mixer, a coffee mill, or a food processor.

The external additive described below is added and mixed in the form of a powder into the resulting dried toner base particles by a dry method, so that toner particles are obtained according to the present invention. The external additive may be mixed using any of various known mixers such as a Turbula mixer, a Henschel mixer, a Nauta mixer, and a V-shaped mixer. For example, when a Henschel mixer is used, stirring and mixing may be performed at 20 to 50° C. for 10 to 30 minutes preferably at a peripheral speed of stirring blade tip of 30 to 80 m/s.

<Volume Average Particle Size of Toner Particles>

The toner particles, in other words, the particles at the stage after the addition of the external additive, preferably have a volume average particle size of 4.0 µm to 10.0 µm. Toner particles with a volume average particle size of less than 4.0 µm can have a reduced fluidity and a reduced rise in charge amount. On the other hand, toner particles with a volume average particle size of more than 10.0 µm may cause a reduction in image quality. The toner particles more preferably have a volume average particle size of 4.5 µm to 8.0 µm, even more preferably 5.0 µm to 7.5 µm.

Specifically, the volume median diameter (D50) measured by the method described below should be used as the volume average particle size of the toner particles.

<<Measurement Method>>

The volume median diameter (D50) of the toner particles can be determined by measurement and calculation using an apparatus including Multisizer 3 (manufactured by Beckman Coulter, Inc.) and a data processing computer system connected thereto.

The measurement procedure includes mixing 0.02 g of the toner particles with 20 mL of a surfactant solution (a surfactant solution prepared for the purpose of dispersing the toner particles by diluting, for example, a surfactant component-containing neutral detergent with pure water by 10-fold) and then subjecting the mixture to ultrasonic dispersion for 1 minute to form a toner particle dispersion.

The toner particle dispersion is injected with a pipet into an Isoton II (manufactured by Beckman Coulter, Inc.)-containing beaker placed in a sample stand, until the measurement concentration falls within the range of 5 to 10%. The number of particles to be counted by the measurement system is set to 25,000 when the measurement is performed.

In this case, Multisizer 3 with an aperture diameter of 100 µm is used. The measurement range of 1 to 30 µm is divided into 256 parts when the frequency value is calculated. The volume median diameter (D50) is defined as the particle size at which the volume fraction of larger particles is 50%.

The volume average particle size of the toner particles can be controlled by controlling the concentration of the coagulant, the added amount of an organic solvent, the fusion time, or other conditions in the production method described above.

<Average Circularity of Toner Particles>

The toner particles preferably have an average circularity of 0.98 or less, more preferably 0.97 or less, even more preferably in the range of 0.93 to 0.97. The toner particles with an average circularity in such a range can be easily charged electrostatically.

The average circularity can be measured using, for example, a flow particle image analyzer FPIA-3000 (manufactured by Sysmex Corporation) and specifically can be measured by the following method.

<<Measurement Method>>

The toner particles are made wet with a surfactant aqueous solution and then subjected to ultrasonic dispersion for 1 minute. Using FPIA-3000 under measurement conditions in HPF (high magnification photographing) mode, the dispersion is measured at a proper concentration in the HPF detection number range of 3,000 to 10,000. In this range, reproducible measurements can be obtained. The circularity is calculated from formula (3) below.

$$\text{Circularity} = \text{(the length of the circumference of a circle having the same projected area as the particle image)/(the length of the circumference of the projection image of the particle)} \quad \text{Formula (3)}$$

The average circularity is the arithmetic mean obtained by summing the circularities of the respective particles and then dividing the sum by the number of all particles measured.

The average circularity of the toner particles can be controlled by controlling the aging treatment temperature or time or other conditions in the production method described above.

[Materials Used to Produce Toner]

(Binder Resin)

A thermoplastic resin is preferably used as the binder resin for forming the toner base particles.

Such a binder resin may be of any type generally used as a component of toner particles. Specifically, such a binder resin may be, for example, a styrene resin, an acrylic resin, a styrene acrylic copolymer resin, a polyester resin, a silicone resin, an olefin resin, an amide resin, or an epoxy resin.

Particularly preferred are a styrene resin, an acrylic resin, a styrene acrylic copolymer resin, and a polyester resin, which have low-viscosity melt properties and highly sharp melting profiles. These resins may be used singly or in combination of two or more. The toner base particles preferably include at least a crystalline polyester resin in order to allow the toner particles to be easily melted so that energy can be saved during fixation. As used herein, the term "crystalline" means that differential scanning calorimetry shows a clear endothermic peak rather than stepwise endothermic changes. In this regard, the clear endothermic peak means that the endothermic peak has a half-width of 15° C. or less as measured at a rate of temperature increase of 10° C./min in the differential scanning calorimetry (DSC) described in Examples.

The crystalline polyester resin is synthesized from a polycarboxylic acid component and a polyalcohol component.

Examples of the polycarboxylic acid component include, but are not limited to, aliphatic dicarboxylic acids such as oxalic acid, succinic acid, glutaric acid, adipic acid, suberic acid, azelaic acid, sebacic acid, 1,9-nonanedicarboxylic acid, 1,10-decanedicarboxylic acid, dodecanedioic acid (1,12-dodecanedicarboxylic acid), 1,14-tetradecanedicarboxylic acid, and 1,18-octadecanedicarboxylic acid; and aromatic dicarboxylic acids such as phthalic acid, isophthalic acid, terephthalic acid, naphthalene-2,6-dicarboxylic acid, malonic acid, mesaconic acid, and other dibasic acids. Examples also include, but are not limited to, anhydrides and lower alkyl esters of these acids. These may be used singly or in combination of two or more.

Examples of tri- or polycarboxylic acids include 1,2,4-benzenetricarboxylic acid, 1,2,5-benzenetricarboxylic acid, 1,2,4-naphthalenetricarboxylic acid, and anhydrides and lower alkyl esters of these acids. These may be used singly or in combination of two or more. In addition to the polycarboxylic acid component, a double bond-containing dicarboxylic acid component may also be used. Examples of the double bond-containing dicarboxylic acid include, but are not limited to, maleic acid, fumaric acid, 3-hexenedioic acid, and 3-octenedioic acid. Examples also include lower esters and anhydrides of these acids.

On the other hand, the polyalcohol component is preferably an aliphatic diol, more preferably a linear aliphatic diol with amain chain of 7 to 20 carbon atoms. When the aliphatic diol is linear, the resulting polyester resin can maintain crystallinity and have a less decreased melting temperature and thus is superior in toner blocking resistance, image storage stability, and low-temperature fixability. When polycondensed with the polycarboxylic acid component, the aliphatic diol with a main chain of 7 to 20 carbon atoms can also form a product that has a lower melting point and thus can achieve low-temperature fixability, while the aliphatic diol with a main chain of 7 to 20 carbon atoms is practically an easily available material. The main chain more preferably has 7 to 14 carbon atoms.

Specific examples of the aliphatic diol suitable for use in the synthesis of the crystalline polyester resin include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, and 1,18-octadecanediol. These may be used singly or in combination of two or more. Among them, 1,8-octanediol, 1,9-nonanediol, and 1,10-decanediol are preferred in view of easy availability. Examples of tri- or polyalcohols include glycerin, trimethylolethane, trimethylolpropane, and pentaerythritol. These may be used singly or in combination of two or more.

According to conventional methods, the crystalline polyester resin may be synthesized by performing a polycondensation reaction between the polycarboxylic acid component and the polyalcohol component in the presence of a polymerization catalyst such as dibutyltin oxide or tetrabutoxy titanate.

The polycondensation reaction is preferably performed at a temperature of 180° C. to 230° C. If necessary, the pressure in the reaction system may be reduced, and the reaction may be performed while water and the alcohol produced by the polycondensation are removed. If the monomers are not soluble or compatible at the reaction temperature, a high-boiling-point solvent may be added as a solubilizer to dissolve the monomers. The polycondensation reaction should be performed while the solubilizing solvent is removed by distillation. If a certain monomer for the copolymerization reaction is less compatible, the less compatible monomer should be condensed with the intended acid or alcohol in advance, and then the product and the main component should be subjected to the polycondensation.

In view of good low-temperature fixability and good image storage stability, the crystalline polyester resin preferably has a weight average molecular weight in the range of 5,000 to 50,000. In the description, the weight average molecular weight of the crystalline polyester resin refers to the value measured by GPC, and it can be measured under the same conditions as in the measurement of the coating resin.

Other binder resins (hereinafter also referred to as "other resins") than the crystalline polyester resin may be used. Examples of polymerizable monomers for the production of other resins include styrene monomers such as styrene, methylstyrene, methoxystyrene, butylstyrene, phenylstyrene, and chlorostyrene; acrylate monomers such as methyl acrylate, ethyl acrylate, n-butyl acrylate, 2-ethylhexyl acrylate, and n-stearyl acrylate; methacrylate monomers such as methyl methacrylate, ethyl methacrylate, n-butyl methacrylate, and 2-ethylhexyl methacrylate; and carboxylic acid monomers such as acrylic acid, methacrylic acid, and fumaric acid. These polymerizable monomers may be used alone or in combination of two or more.

These other resins can be produced by a known method such as a suspension polymerization method, an emulsion polymerization method, or a dispersion polymerization method. Particularly in view of particle size control, an emulsion polymerization method is preferred.

When other resins are produced by an emulsion polymerization method, a radical polymerization initiator may be used, examples of which include persulfates such as potassium persulfate and ammonium persulfate; and water-soluble azo compounds such as 4,4'-azobis(4-cyanovaleric acid) and 2,2'-azobis(2-amidinopropane) hydrochloride; and hydrogen peroxide. If necessary, these radical polymerization initiators may be used in the form of redox polymerization initiators. Examples of such initiators include a combination of a persulfate and sodium metabisulfite or sodium sulfite and a combination of hydrogen peroxide and ascorbic acid. A chain transfer agent may also be used, examples of which include thiol compounds such as n-dodecyl mercaptan, tert-dodecyl mercaptan, and n-octyl mercaptan; and halogenated methanes such as tetrabromomethane and tribromomethane.

In view of low-temperature fixability and image storage stability, other resins preferably have a weight average molecular weight in the range of 10,000 to 50,000. In this regard, the weight average molecular weight of other resins is the values measured by GPC, and it can be measured under the same conditions as in the measurement of the coating resin.

[External Additive]

An external additive is allowed to adhere to the surfaces of the toner base particles in order to control fluidity, chargeability, and cleanability. The external additive may be conventionally known metal oxide particles, examples of which include silica particles, titania particles, alumina particles, zirconia particles, zinc oxide particles, chromium oxide particles, cerium oxide particles, antimony oxide particles, tungsten oxide particles, tin oxide particles, tellurium oxide particles, manganese oxide particles, and boron oxide particles. These may be used alone or in combination of two or more.

In particular, silica particles are preferably those prepared by sol-gel method. Silica particles prepared by sol-gel method are characterized by having a narrow particle size distribution and therefore are preferred in order to reduce variations in the adhering strength. Silica particles formed by sol-gel method preferably have a number average primary particle size in the range of 70 to 150 nm. Silica particles with a number average primary particle size in this range have a particle size larger than that of other external additives and thus can serve as spacers. Therefore, when stirred and mixed with other external additives with smaller particle sizes in a developing machine, silica particles with such a number average primary particle size will have the effect of preventing other external additives from being buried in the toner base particles and will also have the effect of preventing the toner base particles from being fused together.

Metal oxide particles other than silica particles prepared by sol-gel method preferably have a number average primary particle size in the range of 10 to 70 nm, more preferably in the range of 10 to 40 nm. The number average primary particle size of metal oxide particles can be measured, for example, by a method of processing an image taken by a transmission electron microscope.

Organic fine particles such as particles of a homopolymer of styrene or methyl methacrylate or a copolymer of styrene and methyl methacrylate may also be used as an external additive.

When used as an external additive, metal oxide particles preferably have undergone surface hydrophobilization with a known surface treatment agent such as a coupling agent. The surface treatment agent is preferably, for example, dimethyldimethoxysilane, hexamethyldisilazane (HMDS), methyltrimethoxysilane, isobutyltrimethoxysilane, or decyltrimethoxysilane.

Silicone oil may also be used as the surface treatment agent. Examples of the silicone oil include organosiloxane oligomers, octamethylcyclotetrasiloxane, or decamethylcyclopentasiloxane, tetramethylcyclotetrasiloxane, tetravinyltetramethylcyclotetrasiloxane, and other cyclic compounds; and linear or branched organosiloxanes. Terminal-modified silicone oil may also be used. Examples of the modifying group include, but are not limited to, an alkoxy group, a carboxyl group, a carbinol group, a higher fatty acid modifier group, a phenol group, an epoxy group, a methacrylic group, and an amino group. Silicone oil having several different modifying groups may also be used, such as amino alkoxy-modified silicone oil.

A mixture treatment or a combination treatment may also be performed using dimethyl silicone oil, the modified silicone oil, and any other surface treatment agent. Examples of the treatment agent that may be used in combination include a silane coupling agent, a titanate coupling agent, an aluminate coupling agent, various silicone oils, fatty acids, fatty acid metal salts, esters thereof, and rosin acids.

The metal oxide particles preferably have a hydrophobicity in the range of about 40 to about 80%. The hydrophobicity of the metal oxide particles is indicated by a measure of wettability with methanol and defined by formula (4) below.

$$\text{Hydrophobicity}=(a/(a+50))\times 100 \quad\quad\quad \text{Formula (4)}$$

The hydrophobicity measuring method is as follows. The particles of 0.2 g to be measured are weighed and added to 50 mL of distilled water in a beaker with a volume of 200 mL. Methanol is slowly added dropwise to the particles from a burette with its tip immersed in the liquid, until the particles being stirred slowly are entirely wetted with methanol. The hydrophobicity is calculated from formula (4) above using the amount a (mL) of methanol required for the particles to be wetted completely.

<Lubricant>

A lubricant may also be used as an external additive for further improving cleanability and transfer. Examples of the lubricant include metal salts of higher fatty acids, such as a zinc, aluminum, copper, magnesium, or calcium salt of stearic acid, a zinc, manganese, iron, copper, or magnesium salt of oleic acid, a zinc, copper, magnesium, or calcium salt of palmitic acid, a zinc or calcium salt of linoleic acid, and a zinc or calcium salt of ricinoleic acid.

The content of these external additives is preferably in the range of 0.1 to 10% by weight, more preferably in the range of 1 to 5% by weight of the total weight of the toner.

[Internal Additives]

Examples of internal additives for use in the present invention include a releasing agent, a charge control agent, and a colorant, which will be described in detail.

<Releasing Agent>

The toner particles may contain a releasing agent. Examples of the releasing agent include, but are not limited to, hydrocarbon waxes such as polyethylene waxes, oxidized polyethylene waxes, polypropylene waxes, and oxidized polypropylene waxes, carnauba waxes, fatty acid ester waxes, Sasolwax, rice waxes, candelilla waxes, jojoba oil waxes, and beeswaxes, and other known waxes.

The content of the releasing agent in the toner particles is preferably in the range of 1 to 30 parts by weight, more preferably in the range of 5 to 20 parts by weight, based on 100 parts by weight of the binder resin.

<Charge Control Agent>

The toner particles may also contain a charge control agent. Examples of the charge control agent include metal complexes, such as zinc or aluminum complexes of salicylic acid derivatives (salicylic acid metal complexes), calixarene compounds, organoboron compounds, and fluorine-containing quaternary ammonium salt compounds.

The content of the charge control agent in the toner particles is preferably in the range of 0.1 to 5 parts by weight based on 100 parts by weigh of the binder resin.

<Colorant>

To form color toner, the toner particles may further contain a colorant or colorants.

Any known inorganic or organic colorant or colorants may be used. Specific colorants will be shown below.

Examples of black colorants include carbon black such as furnace black, channel black, acetylene black, thermal black, and lamp black, and magnetic powders such as magnetite and ferrite.

Examples of magenta or red colorants include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 60, C.I. Pigment Red 63, C.I. Pigment Red 64, C.I. Pigment Red 68, C.I. Pigment Red 81, C.I. Pigment Red 83, C.I. Pigment Red 87, C.I. Pigment Red 88, C.I. Pigment Red 89, C.I. Pigment Red 90, C.I. Pigment Red 112, C.I. Pigment Red 114, C.I. Pigment Red 122, C.I. Pigment Red 123, C.I. Pigment Red 139, C.I. Pigment Red 144, C.I. Pigment Red 149, C.I. Pigment Red 150, C.I. Pigment Red 163, C.I. Pigment Red 166, C.I. Pigment Red 170, C.I. Pigment Red 177, C.I. Pigment Red 178, C.I. Pigment Red 184, C.I. Pigment Red 202, C.I. Pigment Red 206, C.I. Pigment Red 207, C.I. Pigment Red 209, C.I. Pigment Red 222, C.I. Pigment Red 238, and C.I. Pigment Red 269.

Examples of orange or yellow colorants include C.I. Pigment Orange 31, C.I. Pigment Orange 43, C.I. Pigment Yellow 12, C.I. Pigment Yellow 14, C.I. Pigment Yellow 15, C.I. Pigment Yellow 17, C.I. Pigment Yellow 74, C.I. Pigment Yellow 83, C.I. Pigment Yellow 93, C.I. Pigment Yellow 94, C.I. Pigment Yellow 138, C.I. Pigment Yellow 155, C.I. Pigment Yellow 162, C.I. Pigment Yellow 180, and C.I. Pigment Yellow 185.

Examples of green or cyan colorants include C.I. Pigment Blue 2, C.I. Pigment Blue 3, C.I. Pigment Blue 15, C.I. Pigment Blue 15:2, C.I. Pigment Blue 15:3, C.I. Pigment Blue 15:4, C.I. Pigment Blue 16, C.I. Pigment Blue 17, C.I. Pigment Blue 60, C.I. Pigment Blue 62, C.I. Pigment Blue 66, and C.I. Pigment Green 7.

Examples of dyes include C.I. Solvent Red 1, C.I. Solvent Red 49, C.I. Solvent Red 52, C.I. Solvent Red 58, C.I. Solvent Red 63, C.I. Solvent Red 111, C.I. Solvent Red 122, C.I. Solvent Yellow 2, C.I. Solvent Yellow 6, C.I. Solvent Yellow 14, C.I. Solvent Yellow 15, C.I. Solvent Yellow 16, C.I. Solvent Yellow 19, C.I. Solvent Yellow 21, C.I. Solvent Yellow 33, C.I. Solvent Yellow 44, C.I. Solvent Yellow 56, C.I. Solvent Yellow 61, C.I. Solvent Yellow 77, C.I. Solvent Yellow 79, C.I. Solvent Yellow 80, C.I. Solvent Yellow 81, C.I. Solvent Yellow 82, C.I. Solvent Yellow 93, C.I. Solvent Yellow 98, C.I. Solvent Yellow 103, C.I. Solvent Yellow 104, C.I. Solvent Yellow 112, C.I. Solvent Yellow 162, C.I. Solvent Blue 25, C.I. Solvent Blue 36, C.I. Solvent Blue 60, C.I. Solvent Blue 70, C.I. Solvent Blue 93, and C.I. Solvent Blue 95.

These colorants may be used alone or in combination of two or more as needed. When a colorant or colorants are used, the content of the colorant or colorants is preferably in the range of 1 to 30% by weight, more preferably in the range of 2 to 20% by weight of the total weight of the toner.

A surface-modified colorant may also be used. In such a case, a conventionally known surface modifier may be used, and specifically, a silane coupling agent, a titanium coupling agent, or an aluminum coupling agent is preferably used as the surface modifier.

(Step e: The Step of Preparing Two-Component Developer)

In this step, a two-component developer is prepared by mixing the coated carrier particles with the toner particles. The mixing apparatus for use in mixing the carrier particles with the toner particles may be, for example, a Henschel mixer, a Nauta mixer, or a V-shaped mixer. The amount of the mixed toner particles is preferably in the range of 1 to 10% by weight of the total weight of the two-component developer.

[Image Forming Method]

The two-component developer produced according to the present invention may be used in various known electrophotographic image forming methods including, for example, monochrome image forming methods and full-color image forming methods. Any type of full-color image forming method may be performed, such as a four cycle type image forming method using a single electrostatic latent image carrier (also referred to as an "electrophotographic photoreceptor" or simply referred to as a "photoreceptor") and developing apparatuses for four colors: yellow, magenta, cyan, and black, or a tandem type image forming method using image forming units that are each installed for each color and each include an electrostatic latent image carrier and a developing apparatus for each color.

Specifically, an electrophotographic image forming method using the two-component developer according to the present invention may be, for example, as follows. An electrostatic latent image carrier is charged by means of an electrostatic charger (the charging step). An electrostatic latent image is electrostatically formed by image exposure to light (the exposure step). In a developing apparatus, the electrostatic latent image is developed using toner particles, which are charged with the carrier particles in the two-component developer according to the present invention, so that a toner image is obtained (the developing step). The toner image is then transferred onto a sheet, if necessary, through an intermediate transfer medium (the transfer step). Subsequently, the toner image transferred onto the sheet is fixed on the sheet by a fixing process such as a contact heating process (the fixing step), so that a visible image is obtained.

EXAMPLES

Hereinafter, the present invention will be more specifically described with reference to examples, which, however, are not intended to limit the present invention. As used in the examples, the term "parts" or "%" refers to "parts by weight" or "% by weight" unless otherwise specified.

[Preparation of Coating Resins]
(Preparation of Coating Resin 1)

Cyclohexyl methacrylate and methyl methacrylate were added in a weight ratio of 50:50 (corresponding to the copolymerization ratio) to an aqueous solution of 0.3% by weight of sodium benzenesulfonate. Potassium persulfate in an amount of 0.5% by weight of the total weight of the monomers was added to the mixture. The resulting mixture was subjected to emulsion polymerization, and then the product was spray-dried to give coating resin 1.

(Preparation of Coating Resins 2 to 4 and 12)

Coating resins 2 to 4 and 12 were prepared as in the preparation of coating resin 1, except that the ratio between cyclohexyl methacrylate and methyl methacrylate was changed according to Table 1.

(Preparation of Coating Resin 5)

Coating resin 5 was prepared as in the preparation of coating resin 1, except that potassium persulfate was replaced with 2,2'-azobis(2-amidinopropane) dihydrochloride.

(Preparation of Coating Resins 6 to 8 and 13)

Coating resins 6 to 8 and 13 were prepared as in the preparation of resin 5, except that the ratio between cyclohexyl methacrylate and methyl methacrylate was changed according to Table 1.

(Preparation of Coating Resin 9)

Coating resin 9 was prepared as in the preparation of coating resin 1, except that cyclohexyl methacrylate was replaced with cyclopentyl methacrylate.

(Preparation of Coating Resin 10)

Coating resin 10 was prepared as in the preparation of coating resin 1, except that cyclohexyl methacrylate was replaced with cyclooctyl methacrylate.

(Preparation of Coating Resin 11)

Coating resin 11 was prepared as in the preparation of coating resin 1, except that potassium persulfate was replaced with tert-butyl hydroperoxide.

TABLE 1

| Coating resin No. | Monomer 1 | Monomer 2 | Polymerization initiator | Copolymerization ratio |
|---|---|---|---|---|
| Resin 1 | Cyclohexyl methacrylate | Methyl methacrylate | Potassium persulfate | 50:50 |
| Resin 2 | Cyclohexyl methacrylate | — | Potassium persulfate | 100:0 |
| Resin 3 | Cyclohexyl methacrylate | Methyl methacrylate | Potassium persulfate | 80:20 |
| Resin 4 | Cyclohexyl methacrylate | Methyl methacrylate | Potassium persulfate | 20:80 |
| Resin 5 | Cyclohexyl methacrylate | Methyl methacrylate | 2,2'-azobis(2-amidinopropane)dihydrochloride | 50:50 |
| Resin 6 | Cyclohexyl methacrylate | — | 2,2'-azobis(2-amidinopropane)dihydrochloride | 100:0 |
| Resin 7 | Cyclohexyl methacrylate | Methyl methacrylate | 2,2'-azobis(2-amidinopropane)dihydrochloride | 80:20 |
| Resin 8 | Cyclohexyl methacrylate | Methyl methacrylate | 2,2'-azobis(2-amidinopropane)dihydrochloride | 20:80 |
| Resin 9 | Cyclopentyl methacrylate | Methyl methacrylate | Potassium persulfate | 50:50 |
| Resin 10 | Cyclooctyl methacrylate | Methyl methacrylate | Potassium persulfate | 50:50 |
| Resin 11 | Cyclohexyl methacrylate | Methyl methacrylate | tert-Butyl hydroperoxide | 50:50 |
| Resin 12 | — | Methyl methacrylate | Potassium persulfate | 0:100 |
| Resin 13 | — | Methyl methacrylate | 2,2'-azobis(2-amidinopropane)dihydrochloride | 0:100 |

[Preparation of Core Particles]

(Preparation of Core Particles 1)

Raw materials were weighed as follows: MnO 35 mol %, MgO 14.5 mol %, $Fe_2O_3$ 50 mol %, and SrO 0.5 mol %. The raw materials were mixed with water and then pulverized in a wet media mill for 5 hours to form a slurry. The resulting slurry was dried in a spray dryer to form truly spherical particles.

The particles were calcined by heating at 950° C. for 2 hours. In a wet ball mill, the calcined product was ground for 1 hour using stainless steel beads with a diameter of 0.5 cm and then further ground for 4 hours using zirconia beads with a diameter of 0.3 cm.

A proper amount of a dispersing agent was added to the resulting slurry, and for the purpose of giving reliable strength to granulated particles, 0.8% by weight (on a solid basis) of polyvinyl alcohol resin (PVA) was added as a binder to the mixture. The resulting mixture was then granulated and dried in a spray dryer. In an electric furnace, the product was subjected to main firing at a temperature of 1,275° C. and an oxygen concentration of 2.5% by volume (in a nitrogen gas atmosphere) for a holding time of 5 hours.

Subsequently, the fired product was crushed and then classified for particle size control. Subsequently, low magnetic force particles were separated from the resulting particles by magnetic separation, so that core particles 1 were obtained.

(Preparation of Core Particles 2 to 4)

Core particles 2 to 4 were prepared as in the preparation of core particles 1, except that the temperature conditions in the electric furnace were changed as shown in Table 2 when the main firing was performed.

(Preparation of Core Particles 5)

Core particles 5 were prepared as in the preparation of core particles 1, except that the time of pulverization with zirconium beads with a diameter of 0.5 cm was changed from 4 hours to 8 hours and the main firing temperature was changed to 1,250° C.

(Preparation of Core Particles 6 to 9)

Core particles 6 to 9 were prepared as in the preparation of core particles 1, except that the classification conditions were controlled.

TABLE 2

| Core particle No. | Median diameter [μm] | Average shape factor (SF-1) | Firing temperature [° C.] |
|---|---|---|---|
| Core 1 | 34 | 120 | 1275 |
| Core 2 | 34 | 145 | 1350 |
| Core 3 | 34 | 140 | 1325 |
| Core 4 | 34 | 110 | 1250 |
| Core 5 | 34 | 105 | 1250 |
| Core 6 | 19.5 | 115 | 1275 |
| Core 7 | 24 | 120 | 1275 |
| Core 8 | 68 | 120 | 1275 |
| Core 9 | 77 | 125 | 1275 |

<Preparation of Carriers>

<<Carrier 1>>

To a high-speed mixer equipped with horizontal stirring blades were added 100 parts by weight of core particles 1 prepared as described above and 3.5 parts by weight of the total of coating resins 1 and 5 in a ratio of 50:50. Carrier 1 was produced by mixing and stirring the core particles and the coating resins at a peripheral speed of horizontal rotary blades of 8 m/sec at 22° C. for 15 minutes and then mixing them at 120° C. for 50 minutes so that the surfaces of the core particles were coated with the coating resins by the action of the mechanical impact force (mechanochemical process).

<<Carriers 2 to 5>>

Carriers 2 to 5 were prepared as in the preparation of carrier 1, except that the ratio between coating resins 1 and 5 was changed as shown in Table 3.

<<Carriers 6 to 13>>

Carriers 6 to 13 were prepared as in the preparation of carrier 1, except that core particles 1 were replaced with core particles 2 to 9.

<<Carriers 14 to 21 and 23 to 28>>

Carriers 14 to 21 and 23 to 28 were prepared as in the preparation of carrier 1, except that the coating resins used were changed as shown in Table 3.

<<Carrier 22>>

A resin solution was prepared by dissolving, in 1,000 parts by weight of toluene, 3.5 parts by weight of the total of coating resins 1 and 5 in a ratio of 50:50. One hundred parts by weight of core particles 1 were fed into a uniaxial indirect heating dryer and held at a temperature of 75° C. The whole amount of the resin solution was added dropwise to core particles 1 with stirring in the dryer. After it was confirmed that toluene was sufficiently volatilized, the temperature in the dryer was increased to 150° C. with stirring and then held for 2 hours. Subsequently, the product was taken out of the dryer, and the particle aggregates were crushed for particle size control, so that carrier 22 was obtained.

TABLE 3

| Carrier No. | Core particle No. | First coating resin No. | Second coating resin No. | Resin ratio | Process | Carrier particle size [μm] |
|---|---|---|---|---|---|---|
| Carrier 1 | Core 1 | Resin 5 | Resin 1 | 50:50 | Dry | 35 |
| Carrier 2 | Core 1 | Resin 5 | Resin 1 | 95:5 | Dry | 35 |
| Carrier 3 | Core 1 | Resin 5 | Resin 1 | 90:10 | Dry | 35 |
| Carrier 4 | Core 1 | Resin 5 | Resin 1 | 10:90 | Dry | 35 |
| Carrier 5 | Core 1 | Resin 5 | Resin 1 | 5:95 | Dry | 35 |
| Carrier 6 | Core 2 | Resin 5 | Resin 1 | 50:50 | Dry | 35 |
| Carrier 7 | Core 3 | Resin 5 | Resin 1 | 50:50 | Dry | 35 |
| Carrier 8 | Core 4 | Resin 5 | Resin 1 | 50:50 | Dry | 35 |
| Carrier 9 | Core 5 | Resin 5 | Resin 1 | 50:50 | Dry | 35 |
| Carrier 10 | Core 6 | Resin 5 | Resin 1 | 50:50 | Dry | 20 |
| Carrier 11 | Core 7 | Resin 5 | Resin 1 | 50:50 | Dry | 25 |
| Carrier 12 | Core 8 | Resin 5 | Resin 1 | 50:50 | Dry | 70 |
| Carrier 13 | Core 9 | Resin 5 | Resin 1 | 50:50 | Dry | 80 |
| Carrier 14 | Core 1 | Resin 5 | Resin 2 | 50:50 | Dry | 35 |
| Carrier 15 | Core 1 | Resin 5 | Resin 3 | 50:50 | Dry | 35 |
| Carrier 16 | Core 1 | Resin 5 | Resin 4 | 50:50 | Dry | 35 |
| Carrier 17 | Core 1 | Resin 6 | Resin 1 | 50:50 | Dry | 35 |
| Carrier 18 | Core 1 | Resin 7 | Resin 1 | 50:50 | Dry | 35 |
| Carrier 19 | Core 1 | Resin 8 | Resin 1 | 50:50 | Dry | 35 |
| Carrier 20 | Core 1 | Resin 5 | Resin 9 | 50:50 | Dry | 35 |
| Carrier 21 | Core 1 | Resin 5 | Resin 10 | 50:50 | Dry | 35 |
| Carrier 22 | Core 1 | Resin 5 | Resin 1 | 50:50 | Wet | 35 |
| Carrier 23 | Core 1 | — | Resin 1 | 0:100 | Dry | 35 |
| Carrier 24 | Core 1 | Resin 5 | — | 100:0 | Dry | 35 |
| Carrier 25 | Core 1 | Resin 5 | Resin 11 | 50:50 | Dry | 35 |
| Carrier 26 | Core 1 | Resin 11 | Resin 1 | 50:50 | Dry | 35 |
| Carrier 27 | Core 1 | Resin 5 | Resin 12 | 50:50 | Dry | 35 |
| Carrier 28 | Core 1 | Resin 13 | Resin 1 | 50:50 | Dry | 35 |

<Preparation of Toner Particles>
[Preparation of Dispersion of Colorant Particles]

A solution was obtained by dissolving 11.5 parts by weight of sodium n-dodecyl sulfate in 160 parts by weight of ion-exchanged water with stirring, and then 24.5 parts by weight of copper phthalocyanine was gradually added to the solution with stirring.

The mixture was then dispersed using a stirrer CLEAR-MIX W MOTION CLM-0.8 (manufactured by M Technique Co., Ltd., "CLEARMIX" is a registered trademark of the company) to form a colorant particle dispersion (A1) in which the copper phthalocyanine particles in the solution had a volume median diameter of 126 nm.

The volume median diameter of the colorant particle dispersion (A1) was determined using an electrophoretic light-scattering photometer ELS-800 (manufactured by Otsuka Electronics Co., Ltd.).

[Preparation of Crystalline Polyester Resin]

A liquid mixture was prepared by adding 300 g of 1,9-nonanediol, 250 g of dodecanedioic acid, and a catalyst Ti(OBu)$_4$ (0.014% by weight based on the weight of the carboxylic acid monomer) to a three-necked flask. Subsequently, the pressure of the air in the flask was reduced by decompression. Nitrogen gas was further introduced into the three-necked flask to form an inert atmosphere in the flask, and then the liquid mixture was refluxed at 180° C. for 6 hours with mechanical stirring. Subsequently, after the unreacted monomer components were removed by distillation under reduced pressure, the product was gradually heated to 220° C. and stirred for 12 hours. When reached a viscous state, the product was cooled to give a crystalline polyester resin (B1). The resulting crystalline polyester resin (B1) had a weight average molecular weight (Mw) of 19,500. The crystalline polyester resin (B1) had a melting point of 75° C.

The Mw of the crystalline polyester resin (B1) is determined as follows using a system HLC-8220 (manufactured by Tosoh Corporation) and columns (TSKguardcolumn+ TSKgel SuperHZM-M)×3 (manufactured by Tosoh Corporation). While the column temperature is kept at 40° C., tetrahydrofuran (THF) as a carrier solvent is allowed to flow at a rate of 0.2 mL/minute through the columns. A sample solution is injected in a volume of 10 μL into the system in which detection is performed using a refractive index detector (RI detector). The Mw of the crystalline polyester resin (B1) is determined through the calculation of the molecular weight distribution of the measurement sample using a calibration curve measured with monodisperse polystyrene standard particles.

The sample solution is prepared by dissolving the measurement sample at a concentration of 1 mg/mL in THF under the conditions of room temperature for 5 minutes using an ultrasonic disperser and then filtering the solution through a membrane filter with a pore size of 0.2 μm. The calibration curve is prepared by measuring at least ten standard polystyrene samples. The standard polystyrene samples used include those with molecular weights of 6×10$^2$, 2.1×10$^3$, 4×10$^3$, 1.75×10$^4$, 5.1×10$^4$, 1.1×10$^5$, 3.9×10$^5$, 8.6×10$^5$, 2×10$^6$, and 4.48×10$^6$ manufactured by Pressure Chemical Company.

The melting point of the crystalline polyester resin (B1) is determined as follows using a differential scanning calorimeter Diamond DSC (manufactured by PerkinElmer Co., Ltd.), in which 3.0 mg of the sample sealed in an aluminum pan is set in the holder while a vacant aluminum pan is set as a reference. The sample is measured under the conditions (heating and cooling conditions) in which a first temperature rise stage from 0° C. to 200° C. at a rate of 10° C./min, a cooling stage from 200° C. to 0° C. at a rate of 10° C./min, and a second temperature rise stage from 0° C. to 200° C. at a rate of 10° C./min are carried out in this order. The melting point of the sample is determined as the temperature at which the top of the endothermic peak derived from the crystalline polyester resin in the first temperature rise stage is located in the DSC curve obtained by the measurement.

[Preparation of Dispersion of Resin Particles (C1) (First Stage Polymerization)]

A 5 L reaction vessel equipped with a stirrer, a temperature sensor, a condenser tube, and a nitrogen inlet system was charged with 4 g of sodium polyoxyethylene (2) dodecyl ether sulfate and 3,000 g of ion-exchanged water. The resulting mixture liquid was heated to a temperature of 80° C. with stirring at a speed of 230 rpm under a nitrogen stream. After the heating, a solution of 10 g of potassium persulfate in 200 g of ion-exchanged water was added to the mixture liquid. While the temperature of the mixture liquid was kept at 75° C., a monomer mixture liquid with the composition below was added dropwise to the mixture liquid over 1 hour. Subsequently, the monomers were polymerized by heating and stirring the mixture liquid at 75° C. for 2 hours to form a dispersion of resin particles (C1).

| Styrene | 568 g |
| n-Butyl acrylate | 164 g |
| Methacrylic acid | 68 g |

[Preparation of Dispersion of Resin Particles (C2) (Second Stage Polymerization)]

A 5 L reaction vessel equipped with a stirrer, a temperature sensor, a condenser tube, and a nitrogen inlet system was charged with a solution prepared by dissolving 2 g of sodium polyoxyethylene (2) dodecyl ether sulfate in 3,000 g of ion-exchanged water. The resulting mixture liquid was heated to 80° C.

On the other hand, the monomers with the composition below were dissolved at 80° C. to form a solution. Subsequently, the solution was added to the mixture liquid and then mixed and dispersed for 1 hour using a circulation path-containing mechanical disperser CLEARMIX (manufactured by M Technique Co., Ltd.) to form a dispersion containing emulsified particles (oil droplets). Subsequently, an initiator solution prepared by dissolving 5 g of potassium persulfate in 100 g of ion-exchanged water was added to the dispersion. The resulting dispersion was heated with stirring at 80° C. for 1 hour so that the monomers were polymerized to form a dispersion of resin particles (C2).

| Resin particles (C1) | 42 g (on a solid basis) |
| Wax | 70 g |
| Crystalline polyester resin (B1) | 70 g |
| Styrene | 195 g |
| n-Butyl acrylate | 91 g |
| Methacrylic acid | 20 g |
| n-Octyl mercaptan | 3 g |

The wax is HNP-0190 (manufactured by NIPPON SEIRO CO., LTD.)

[Preparation of Dispersion of Core-Forming Resin Particles (C3) (Third Stage Polymerization)]

A solution prepared by dissolving 10 g of potassium persulfate in 200 g of ion-exchanged water was further added to the dispersion of resin particles (C2). While the resulting dispersion was kept at 80° C., the monomer mixture liquid with the composition below was added dropwise to the dispersion over 1 hour. After the dropwise addition was completed, the resulting dispersion was heated with stirring for 2 hours so that the monomers were polymerized. Subsequently, the dispersion was cooled to 28° C. to give a dispersion of core-forming resin particles (C3).

| Styrene | 298 g |
| n-Butyl acrylate | 137 g |
| n-Stearyl acrylate | 50 g |
| Methacrylic acid | 64 g |
| n-Octyl mercaptan | 6 g |

[Preparation of Dispersion of Shell-Forming Resin Particles (D1)]

A reaction vessel equipped with a stirrer, a temperature sensor, a condenser tube, and a nitrogen inlet system was charged with a surfactant solution prepared by dissolving 2.0 g of sodium polyoxyethylene dodecyl ether sulfate in 3,000 g of ion-exchanged water. The solution was heated to a temperature of 80° C. with stirring at a speed of 230 rpm under a nitrogen stream. An initiator solution prepared by dissolving 10 g of potassium persulfate in 200 g of ion-exchanged water was added to the solution. The monomer mixture liquid with the composition below was then added dropwise to the resulting solution over 3 hours. After the dropwise addition, the resulting mixture liquid was heated at 80° C. with stirring for 1 hour so that the monomers were polymerized to form a dispersion of shell-forming resin particles (D1).

| Styrene | 564 g |
| n-Butyl acrylate | 140 g |
| Methacrylic acid | 96 g |
| n-Octyl mercaptan | 12 g |

[Preparation of Core-Shell Particles (Coagulating and Fusing Step)]

A 5 L reaction vessel quipped with a stirrer, a temperature sensor, a condenser tube, and a nitrogen inlet system was charged with 360 g (on a solid basis) of the dispersion of core-forming resin particles (C3), 1,100 g of ion-exchanged water, and 50 g of the colorant particle dispersion (A1). After the temperature of the resulting dispersion was controlled to 30° C., an aqueous 5 N sodium hydroxide solution was added to the dispersion to adjust the pH of the dispersion to 10. Subsequently, an aqueous solution prepared by dissolving 60 g of magnesium chloride in 60 g of ion-exchanged water was added to the dispersion under stirring at 30° C. over 10 minutes. After the addition, the dispersion was held at 30° C. for 3 minutes and then started to be heated. The dispersion was heated to 85° C. over 60 minutes and then held at a temperature of 85° C. while the particle growth reaction was continued, so that a dispersion of pre-core particles was obtained.

In this state, the size of the pre-core particle aggregates was measured with Coulter Multisizer 3 (manufactured by Beckman Coulter, Inc.). At the time when the number median diameter of the pre-core particles reached 5.9 µm, an aqueous solution prepared by dissolving 40 g of sodium chloride in 160 g of ion-exchanged water was added to the dispersion to stop the growth of the pre-core particles. In addition, an aging step was performed, in which fusion of the pre-core particles was allowed to proceed by stirring at a liquid temperature of 80° C. for 1 hour, so that core particles were formed.

Subsequently, 80 g (on a solid basis) of the shell-forming resin particles (D1) were added to the core particles and continuously stirred at 80° C. for 1 hour, so that the shell-forming resin particles (D1) were fused to the surfaces of the core particles to form shell layers and thus resin particles were obtained. Thereafter, an aqueous solution prepared by dissolving 150 g of sodium chloride in 600 g of ion-exchanged water was added to the resulting dispersion, and the resulting mixture was subjected to an aging treatment at a liquid temperature of 80° C. At the time when the average circularity of the resin particles reached 0.965, the mixture was cooled to 30° C. After the cooling, the core-shell particles had a number median diameter of 6.0 µm and an average circularity of 0.965.

The average circularity of the core-shell particles was determined as the average of circularities obtained based on the above measurement conditions using a flow particle image analyzer FPIA-3000. The number median diameter of the core-shell particles was measured in the same manner as in the measurement of the core particles using Coulter Multisizer 3.

[Preparation of Toner Base Particles (Washing and Drying Step)]

The dispersion of core-shell particles produced in the coagulating and fusing step was subjected to solid-liquid separation using a centrifuge, so that a wet cake of the core-shell particles was formed. The wet cake was washed with ion-exchanged water at 35° C. until the electric conductivity of the resulting filtrate from the centrifuge reached 5 µS/cm. Subsequently, the cake was transferred to Flash Jet Dryer (manufactured by Seishin Enterprise Co., Ltd.) and then dried until the water content reached 0.8% by weight, so that toner base particles 1 were obtained.

[Preparation of Toner Particles 1 (External Additive Treatment Step)]

The powders shown below were added in the amounts shown below to 100 parts by weight of toner base particles 1. The mixture was added to a Henschel mixer FM20C/I (manufactured by NIPPON COKE & ENGINEERING CO., LTD.) and stirred for 15 minutes at such a stirring blade rotation speed that the top of the blade had a peripheral speed of 40 m/s, so that toner particles 1 were obtained.

| | |
|---|---|
| Sol-gel silica 1 | 1.0 part by weight |
| Hydrophobic silica | 2.5 parts by weight |
| Hydrophobic titanium oxide | 0.5 parts by weight |

The sol-gel silica has undergone hexamethyldisilazane (HMDS) treatment and has a hydrophobicity of 72% and a number average primary particle size of 130 nm. The hydrophobic silica has undergone HMDS treatment and has a hydrophobicity of 72% and a number average primary particle size of 40 nm. The hydrophobic titanium oxide has undergone HMDS treatment and has a hydrophobicity of 55% and a number average primary particle size of 20 nm.

The temperature of the mixed powder was set to 40° C.±1° C. when the powders were externally mixed with toner particles 1. The temperature inside the Henschel mixer was controlled in such a manner that when the temperature reached 41° C., cooling water was allowed to flow at a rate of 5 L/minute through the outer bath for the Henschel mixer and when the temperature reached 39° C., the cooling water was allowed to flow at a rate of 1 L/minute.

[Preparation of Two-Component Developer 1]

Two-component developer 1 was prepared by mixing 95 parts by weight of carrier 1 with 5 parts by weight of toner 1. The preparation of the two-component developer was performed by mixing the toner particles and the carrier particles using a V-blender in an environment at normal temperature and normal humidity (temperature 20° C., relative humidity 50% RH). The process was performed at a V-blender rotation speed of 20 rpm for a stirring time of 20 minutes, and the mixture was sieved through a mesh with an aperture of 125 µm to give the product.

[Preparation of Two-Component Developers 2 to 28]

Two-component developers 2 to 28 were prepared as in the preparation of two-component developer 1, except that carrier 1 was changed to each of carriers 2 to 28.

[Evaluations]

A commercially available high-speed monochrome on-demand printing system bizhub PRO 1250 (manufactured by KONICA MINOLTA, INC.) was provided as a system for evaluating two-component developers. Evaluation was performed as described below using the system loaded with each of the prepared two-component developers.

[Evaluation of Charge Amount]

The charge amount was determined by sampling the two-component developer for measurement from the copying machine and measuring the sample with a blow-off type charge quantity meter TB-200 (manufactured by TOSHIBA CORPORATION) under the conditions described below.

The charge amount at normal temperature and normal humidity (20° C., 50% RH) (NN) was determined by measuring the two-component developer at the initial stage and after printing on 300,000 sheets.

The charge amount in a low-temperature, low-humidity environment (10° C., 20% RH) (LL) was determined by measuring the two-component developer at the initial stage and after the two-component developer was allowed to stand for 24 hours in a low-temperature, low-humidity environment (10° C., 20% RH) after printing on 300,000 sheets.

The charge amount in a high-temperature, high-humidity environment (30° C., 80% RH) (HH) was determined by measuring the two-component developer at the initial stage and after the two-component developer was allowed to stand for 24 hours in a high-temperature, high-humidity environment (30° C., 80% RH) after printing on 300,000 sheets.

<Criteria for Evaluation of Initial NN Charge Amount>

The initial NN charge amount was determined by measuring the amount of charge on the initial two-component developer at normal temperature and normal humidity (20° C., 50% RH).

⊙: The charge amount is in the range of −50 µC/g to −43 µC/g.

○: The charge amount is in the range of more than −43 µC/g to −40 µC/g and in the range of more than −55 µC/g to less than −50 µC/g.

X: The charge amount is more than −40 µC/g or less than −55 µC/g.

The amount of charge on the initial toner is evaluated as acceptable when it is in the range of −55 µC/g to −40 µC/g at normal temperature and normal humidity.

<Criteria for Evaluation of Initial Environmentally-Induced Difference>

The initial LL charge amount (A) in a low-temperature, low-humidity environment (10° C., 20% RH) was determined by measuring the charge amount after the initial two-component developer was allowed to stand for 24 hours in a low-temperature, low-humidity environment (10° C., 20% RH).

The initial HH charge amount in a high-temperature, high-humidity environment (30° C., 80% RH) was determined by measuring the charge amount after the initial two-component developer was allowed to stand for 24 hours in a high-temperature, high-humidity environment (30° C., 80% RH).

The initial environmentally-induced difference was defined as the charge amount obtained by subtracting the determined initial HH charge amount from the determined initial LL charge amount.

☉: The difference is 5 μC/g or less.
○: The difference is in the range of more than 5 μC/g to 8 μC/g.
X: The difference is more than 8 μC/g.

The initial environmentally-induced difference is evaluated as an acceptable level when it is 8 μC/g or less.

<Criteria for Evaluation of NN Charge Amount after Durability Test>

The NN charge amount (B) after a durability test was determined by measuring the amount of charge on the two-component developer after printing on 300,000 sheets at normal temperature and normal humidity (20° C., 50% RH).

☉: The charge amount is in the range of −50 μC/g to −40 μC/g.
○: The charge amount is in the range of more than −40 μC/g to −36 μC/g and in the range of −55 μC/g to less than −50 μC/g.
X: The charge amount is more than −36 μC/g or less than −55 μC/g.

The charge amount after a durability test is evaluated as an acceptable level when the charge amount is in the range of −55 μC/g to −36 μC/g after printing on 300,000 sheets at normal temperature and normal humidity.

<Criteria for Evaluation of Durability (NN Charge Amount after Durability Test—Initial NN Charge Amount)>

A difference between the NN charge amount (B) after a durability test and the initial NN charge amount (A) (the NN charge amount (B) after a durability test—the initial NN charge amount (A)) was calculated and used as a criterion for evaluation of durability.

☉: The difference is 3 μC/g or less.
○: The difference is more than 3 μC/g to 6 μC/g.
X: The difference is more than 6 μC/g.

The initial charge amount at normal temperature and normal humidity—the charge amount after printing on 300,000 sheets at normal temperature and normal humidity is evaluated as an acceptable level when it is 6 μC/g or less.

TABLE 4

| Two-component developer No. | Carrier No. | Initial charge amount NN charge amount (A) [μC/g] | Evaluation | Environmentally-induced difference in initial charge amount LL charge amount - HH charge amount [μC/g] | Evaluation | Charge amount after durability test NN charge amount (B) [μC/g] | Evaluation | Durability Charge amount (after durability test - initial) [μC/g] | Evaluation | Note |
|---|---|---|---|---|---|---|---|---|---|---|
| Developer 1 | Carrier 1 | −46 | ☉ | 3 | ☉ | −43 | ☉ | 3 | ☉ | Inventive |
| Developer 2 | Carrier 2 | −52 | ○ | 8 | ○ | −47 | ☉ | 5 | ○ | Inventive |
| Developer 3 | Carrier 3 | −50 | ☉ | 5 | ☉ | −47 | ☉ | 3 | ☉ | Inventive |
| Developer 4 | Carrier 4 | −43 | ☉ | 1 | ☉ | −42 | ☉ | 1 | ☉ | Inventive |
| Developer 5 | Carrier 5 | −40 | ○ | 1 | ☉ | −37 | ○ | 3 | ☉ | Inventive |
| Developer 6 | Carrier 6 | −45 | ☉ | 3 | ☉ | −40 | ☉ | 5 | ○ | Inventive |
| Developer 7 | Carrier 7 | −45 | ☉ | 3 | ☉ | −42 | ☉ | 3 | ☉ | Inventive |
| Developer 8 | Carrier 8 | −47 | ☉ | 4 | ☉ | −45 | ☉ | 2 | ☉ | Inventive |
| Developer 9 | Carrier 9 | −47 | ☉ | 6 | ○ | −45 | ☉ | 2 | ☉ | Inventive |
| Developer 10 | Carrier 10 | −48 | ☉ | 4 | ☉ | −42 | ☉ | 6 | ○ | Inventive |
| Developer 11 | Carrier 11 | −47 | ☉ | 3 | ☉ | −44 | ☉ | 3 | ☉ | Inventive |
| Developer 12 | Carrier 12 | −45 | ☉ | 3 | ☉ | −42 | ☉ | 3 | ☉ | Inventive |
| Developer 13 | Carrier 13 | −45 | ☉ | 2 | ☉ | −40 | ☉ | 5 | ○ | Inventive |
| Developer 14 | Carrier 14 | −43 | ☉ | 1 | ☉ | −40 | ☉ | 3 | ☉ | Inventive |
| Developer 15 | Carrier 15 | −44 | ☉ | 2 | ☉ | −41 | ☉ | 3 | ☉ | Inventive |
| Developer 16 | Carrier 16 | −46 | ☉ | 4 | ☉ | −43 | ☉ | 3 | ☉ | Inventive |
| Developer 17 | Carrier 17 | −45 | ☉ | 2 | ☉ | −41 | ☉ | 4 | ○ | Inventive |
| Developer 18 | Carrier 18 | −45 | ☉ | 3 | ☉ | −42 | ☉ | 3 | ☉ | Inventive |
| Developer 19 | Carrier 19 | −47 | ☉ | 4 | ☉ | −43 | ☉ | 4 | ○ | Inventive |
| Developer 20 | Carrier 20 | −45 | ☉ | 3 | ☉ | −41 | ☉ | 4 | ○ | Inventive |
| Developer 21 | Carrier 21 | −44 | ☉ | 3 | ☉ | −40 | ☉ | 4 | ○ | Inventive |
| Developer 22 | Carrier 22 | −47 | ☉ | 7 | ○ | −43 | ☉ | 4 | ○ | Inventive |
| Developer 23 | Carrier 23 | −38 | X | 1 | ☉ | −35 | X | 3 | ☉ | Comparative |
| Developer 24 | Carrier 24 | −52 | ○ | 10 | X | −49 | ☉ | 3 | ☉ | Comparative |
| Developer 25 | Carrier 25 | −47 | ☉ | 10 | X | −44 | ☉ | 3 | ☉ | Comparative |
| Developer 26 | Carrier 26 | −38 | X | 4 | ☉ | −34 | X | 4 | ○ | Comparative |
| Developer 27 | Carrier 27 | −47 | ☉ | 10 | X | −39 | ○ | 8 | X | Comparative |
| Developer 28 | Carrier 28 | −48 | ☉ | 13 | X | −38 | ○ | 10 | X | Comparative |

Table 4 shows that two-component developers 1 to 22 obtained according to the present invention have a larger charge amount, resist environmental temperature and humidity change-induced fluctuations in charge amount, and have high durability against printing on a large number of sheets, which demonstrates that advantageous effects are produced by the present invention.

This would be because the coating material as a component of the carrier is obtained by mixing first coating resin particles containing nitrogen atoms with second coating resin particles containing sulfur atoms, and an alicyclic methacrylate monomer is used to form the particles of both resins, so that improvement in charge amount and reduction in environmental temperature and humidity change-induced fluctuations in charge amount can be achieved at a certain level that is not achievable by using particles of one of the resins and so that highly-durable two-component developers can be produced.

In contrast, two-component developers 23 to 28 of comparative examples have been found to be unacceptable in at least one of the evaluation items and not to produce any advantageous effect of the present invention.

As described above, the present invention makes it possible to provide methods for producing an electrostatic latent image developing carrier and a two-component developer that can each have a larger charge amount and resist environmental temperature and humidity change-induced fluctuations in charge amount, and thus can each prevent image density reduction, fogging, and toner scattering, and can also each have high durability.

Although the present invention has been described and illustrated in detail, it is clearly understood that the same is by way of illustrated and example only and is not to be taken byway of limitation, the scope of the present invention being interpreted by terms of the appended claims.

What is claimed is:

1. A method for producing a carrier for developing an electrostatic latent image, the carrier comprising carrier particles each comprising a core particle with a surface coated with a coating material comprising a resin, the method comprising the steps of:
   a) obtaining first coating resin particles by polymerizing an alicyclic methacrylate monomer using, as a polymerization initiator, an azo compound having a nitrogen atom-containing substituent;
   b) obtaining second coating resin particles by polymerizing an alicyclic methacrylate monomer using a persulfate as a polymerization initiator; and
   c) forming carrier particles by coating surfaces of core particles with a coating material obtained by mixing at least the first and second coating resin particles.

2. The method for producing a carrier for developing an electrostatic latent image according to claim 1, wherein
   the ratio between the first and second coating resin particles is in the range of 10:90 to 90:10.

3. The method for producing a carrier for developing an electrostatic latent image according to claim 1, wherein
   the alicyclic methacrylate monomers make up 20 to 100% by weight of the total weight of monomers used to form the first and second coating resin particles.

4. The method for producing a carrier for developing an electrostatic latent image according to claim 1, wherein
   the alicyclic methacrylate monomers used to form the first and second coating resin particles have a cycloalkyl group of 5 to 8 carbon atoms.

5. The method for producing a carrier for developing an electrostatic latent image according to claim 1, wherein
   the alicyclic methacrylate monomer used to form the first coating resin particles has a cycloalkyl group, the alicyclic methacrylate monomer used to form the second coating resin particles has a cycloalkyl group, and these cycloalkyl groups have the same number of carbon atoms.

6. The method for producing a carrier for developing an electrostatic latent image according to claim 1, wherein
   the core particles have an average shape factor in the range of 110 to 140.

7. The method for producing a carrier for developing an electrostatic latent image according to claim 1, wherein
   the core particles have a median diameter in the range of 25 to 70 µm.

8. The method for producing a carrier for developing an electrostatic latent image according to claim 1, wherein
   the coating material is produced by a dry coating method.

9. A method for producing a two-component developer comprising toner particles comprising toner base particles and an external additive adhering to the toner base particles, and carrier particles each comprising a core particle with a surface coated with a coating material comprising a resin, the method comprising the steps of:
   a) obtaining first coating resin particles by polymerizing an alicyclic methacrylate monomer using, as a polymerization initiator, an azo compound having a nitrogen atom-containing substituent;
   b) obtaining second coating resin particles by polymerizing an alicyclic methacrylate monomer using a persulfate as a polymerization initiator;
   c) forming carrier particles by coating surfaces of core particles with a coating material obtained by mixing at least the first and second coating resin particles;
   d) forming toner particles by allowing an external additive to adhere to toner base particles; and
   e) obtaining a two-component developer by mixing the coated carrier particles with the toner particles.

10. The method for producing a two-component developer according to claim 9, wherein
    the toner comprises a crystalline resin and an amorphous resin.

* * * * *